(12) United States Patent
Mitchell

(10) Patent No.: US 11,542,193 B2
(45) Date of Patent: *Jan. 3, 2023

(54) GLASS-CERAMIC AND METHODS OF MAKING THE SAME

(71) Applicant: CORNING INCORPORATED, Corning, NY (US)

(72) Inventor: Alexandra Lai Ching Kao Andrews Mitchell, Ithaca, NY (US)

(73) Assignee: CORNING INCORPORATED, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/910,713

(22) Filed: Jun. 24, 2020

(65) Prior Publication Data

US 2020/0407268 A1 Dec. 31, 2020

Related U.S. Application Data

(60) Provisional application No. 62/867,529, filed on Jun. 27, 2019.

(51) Int. Cl.
| | |
|---|---|
| *C03C 10/02* | (2006.01) |
| *C03B 32/02* | (2006.01) |
| *C03C 4/02* | (2006.01) |
| *C03C 10/00* | (2006.01) |

(52) U.S. Cl.
CPC .......... *C03C 10/0045* (2013.01); *C03B 32/02* (2013.01); *C03C 4/02* (2013.01); *C03C 10/0036* (2013.01); *C03C 2204/00* (2013.01)

(58) Field of Classification Search
CPC ........................... C03C 10/00; C03C 10/0045
See application file for complete search history.

(56) References Cited

U.S. PATENT DOCUMENTS

| | | | | |
|---|---|---|---|---|
| 5,476,821 A | * | 12/1995 | Beall | G11B 5/73921 501/10 |
| 5,968,857 A | * | 10/1999 | Pinckney | C03C 10/0036 501/10 |
| 11,192,818 B2 | * | 12/2021 | Beall | H05K 5/0017 |
| 2012/0114955 A1 | | 5/2012 | Almoric et al. | |
| 2017/0283307 A1 | | 10/2017 | Yuan et al. | |
| 2019/0161397 A1 | * | 5/2019 | Beall | C03C 3/085 |
| 2020/0172432 A1 | * | 6/2020 | Beall | C03B 23/0305 |

OTHER PUBLICATIONS

International Search Report and Written Opinion of the International Searching Authority; PCT/US2020/039720; dated Sep. 25, 2020; 10 Pages; European Patent Office.

(Continued)

*Primary Examiner* — Karl E Group
(74) *Attorney, Agent, or Firm* — Kevin M. Johnson

(57) ABSTRACT

A glass-ceramic that includes a first crystal phase including $(Mg_xZn_{1-x})Al_2O_4$, where x is ≤1, and a second crystal phase including tetragonal $ZrO_2$. The glass-ceramic may be substantially free of arsenic, tin, antimony, and cesium, each of the arsenic, tin, antimony, and cesium present at less than 0.01% (by mole of oxide). Further, the glass-ceramic may include a transmittance of at least about 80% to light having a wavelength of 380 nm to 760 nm.

13 Claims, 5 Drawing Sheets

(56) References Cited

OTHER PUBLICATIONS

Marc et al., "Crystallization and mechanical properties of MgO/Al2O3/SiO2/ZrO2glass-ceramics with and without the addition of yttria", Solid State Sciences, vol. 13, No. 12, Oct. 12, 2011, pp. 2146-2153.

Sabrina et al., "High-strength, translucent glass-ceramics in the system MgO—ZnO—Al2O3—SiO2—ZrO2", Journal of the European Ceramic Society, vol. 37, No. 7, Feb. 27, 2017, pp. 2685-2694.

* cited by examiner

GLASS-CERAMIC AND METHODS OF MAKING THE SAME

This application claims the benefit of priority of U.S. Provisional Application Ser. No. 62/867,529 filed on Jun. 27, 2019 the content of which is relied upon and incorporated herein by reference in its entirety.

FIELD

The present disclosure generally relates to glass-ceramics that are suitable for use as a cover glass or a housing for electronic devices. More specifically, the present disclosure relates to glass-ceramics that may be transparent to visible light and substantially free of arsenic, tin, antimony, and cesium.

BACKGROUND

Glass-ceramics are prevalent in various displays and display devices of many consumer electronic products. For example, chemically strengthened glass-ceramics are favored for many touch-screen products, including cell phones, music players, e-book readers, notepads, tablets, laptop computers, automatic teller machines, and other similar devices. The materials used to form the display and housing of electronic devices are typically selected to satisfy mechanical requirements relating to the end use of the electronic devices. For example, to be selected for use as a cover glass material for a display of an electronic device, a glass-ceramic should have sufficient hardness, scratch-resistance, and transparency. The ability of a glass-ceramic to be strengthened using an ion-exchange process is also desirable. In addition, it is often desirable, from an environmental and cost standpoint, that the glass-ceramic be free of materials such as arsenic, tin, antimony, and/or cesium.

Accordingly, there is a need for a glass-ceramic that is transparent, has mechanical properties suitable for use as a display or housing of an electronic device, and that is substantially free of arsenic, tin, antimony, and cesium.

SUMMARY

According to an aspect of the present disclosure, a glass-ceramic includes a first crystal phase including $(Mg_xZn_{1-x})Al_2O_4$, where x is ≤1, and a second crystal phase including tetragonal $ZrO_2$. The glass-ceramic is substantially free of arsenic, tin, antimony, and cesium, each of the arsenic, tin, antimony, and cesium present at less than 0.01% (by mole of oxide), and wherein the glass-ceramic comprises a transmittance of at least 80% to light having a wavelength of 380 nm to 760 nm.

According to an aspect of the present disclosure, a glass-ceramic includes a first crystal phase including $(Mg_xZn_{1-x})Al_2O_4$, where x is ≤1, and a second crystal phase including tetragonal $ZrO_2$. The glass-ceramic is substantially free of arsenic, tin, antimony, and cesium, each of the arsenic, tin, antimony, and cesium present at less than 0.01% (by mole of oxide), and wherein the glass-ceramic comprises a transmittance of at least 80% to light having a wavelength of 380 nm to 760 nm. The glass-ceramic is derived from a glass-ceramic precursor composition that includes: $SiO_2$ from about 35% to about 60%, $Al_2O_3$ from about 13% to about 30%, ZnO from about 0% to about 20%, $ZrO_2$ from about 0% to about 10%, and MgO from about 0.01% to about 20% (by mole of oxide).

According to an aspect of the present disclosure, a method of making a glass-ceramic includes forming a glass-ceramic precursor from a composition including: $SiO_2$ from about 35% to about 60%, $Al_2O_3$ from about 13% to about 30%, ZnO from about 0% to about 20%, $ZrO_2$ from about 0% to about 10%, and MgO from about 0.01% to about 20% (by mole of oxide). The glass-ceramic precursor is heated to form a glass-ceramic article that includes a first crystal phase including $(Mg_xZn_{1-x})Al_2O_4$, where x is ≤1, and a second crystal phase including tetragonal $ZrO_2$. The glass-ceramic is substantially free of arsenic, tin, antimony, and cesium, and each of the arsenic, tin, antimony, and cesium are present at less than 0.01% (by mole of oxide). The glass-ceramic is characterized by a transmittance of at least 80% to light having a wavelength of 380 nm to 760 nm.

According to aspect (1), a glass-ceramic is provided. The glass-ceramic comprises: a first crystal phase including $(Mg_xZn_{1-x})Al_2O_4$, where x is ≤1; and a second crystal phase including tetragonal $ZrO_2$. The glass-ceramic is substantially free of arsenic, tin, antimony, and cesium, each of the arsenic, tin, antimony, and cesium present at less than 0.01% (by mole of oxide). The glass-ceramic comprises a transmittance of at least about 80% to light having a wavelength of 380 nm to 760 nm.

According to aspect (2), the glass-ceramic of aspect (1) is provided, wherein the glass-ceramic comprises at least one of: a CIE LAB L* value greater than about 90; a CIE LAB a* value of about −0.2 to about 0.2; and a CIE LAB b* value of about −0.1 to about 0.8, wherein L*, a*, and b* are each measured at an angle of incidence (AOI) of 10 degrees with a D65 illuminant at a wavelength range of 380 nm to 760 nm.

According to aspect (3), the glass-ceramic of aspect (1) or (2) is provided, further comprising: $SiO_2$ from about 35% to about 60% (by mole of oxide).

According to aspect (4), the glass-ceramic of any one of aspects (1) to (3) is provided, further comprising at least one of: $Fe_2O_3$ at less than about 0.02% (by weight); and a ratio of an $Fe^{2+}$ content to a total iron content ($Fe^{2+}+Fe^{3+}$) of less than about 0.

According to aspect (5), the glass-ceramic of any one of aspects (1) to (4) is provided, further comprising at least one of: $TiO_2$ at about 0% to about 4% (by mole of oxide); and $Na_2O$ at greater than about 2% (by mole of oxide).

According to aspect (6), the glass-ceramic of any one of aspects (1) to (5) is provided, wherein the glass-ceramic is substantially free of BaO, the BaO at less than 0.01% (by mole of oxide).

According to aspect (7), the glass-ceramic of any one of aspects (1) to (6) is provided, wherein the glass-ceramic further comprises a crystallinity of at least about 10% (by weight).

According to aspect (8), the glass-ceramic of any one of aspects (1) to (7) is provided, wherein the first crystal phase is further characterized by a crystallite size of less than about 20 nm.

According to aspect (9), the glass-ceramic of any one of aspects (1) to (8) is provided, wherein the glass-ceramic further comprises a maximum hardness of about 8 GPa to about 15 GPa, as measured by a Berkovich nanoindenter.

According to aspect (10), the glass-ceramic of any one of aspects (1) to (9) is provided, wherein the glass-ceramic further comprises a modulus of elasticity of about 90 GPa to about 120 GPa, as measured using resonant ultrasonic spectroscopy.

According to aspect (11), the glass-ceramic of any one of aspects (1) to (10) is provided, wherein the glass-ceramic further comprises at least one of: a haze value of less than about 0.7% for light having a wavelength of 300 nm; a haze value of less than about 0.5% for light having a wavelength of 350 nm; and a haze value of less than about 0.3% for light having a wavelength of 400 nm to 800 nm.

According to aspect (12), the glass-ceramic of any one of aspects (1) to (11) is provided, wherein the glass-ceramic further comprises at least one of: an axial transmittance of at least about 30% to light having a wavelength of 300 nm; an axial transmittance of at least about 65% to light having a wavelength of 350 nm; an axial transmittance of at least about 80% to light having a wavelength of 400 nm; an axial transmittance of at least about 85% to light having a wavelength of 450 nm; and an axial transmittance of at least about 85% to light having a wavelength of 500 nm to 800 nm.

According to aspect (13), the glass-ceramic of any one of aspects (1) to (12) is provided, wherein the glass-ceramic further comprises at least one of: an absorbance of less than about 0.5 absorbance units/millimeter (a.u./mm) for light having a wavelength of 300 nm; an absorbance of less than about 0.15 absorbance units/millimeter (a.u./mm) for light having a wavelength of 350 nm; and an absorbance of less than about 0.1 absorbance units/millimeter (a.u./mm) for light having a wavelength of 500 nm to 800 nm.

According to aspect (14), a glass-ceramic is provided. The glass-ceramic comprises: a first crystal phase including $(Mg_xZn_{1-x})Al_2O_4$, where x≤1; a second crystal phase including tetragonal $ZrO_2$. The glass-ceramic is substantially free of arsenic, tin, antimony, and cesium, each of the arsenic, tin, antimony, and cesium present at less than 0.01% (by mole of oxide). The glass-ceramic comprises a transmittance of at least 80% to light having a wavelength of 380 nm to 760 nm, and further wherein the glass-ceramic is derived from a glass-ceramic precursor composition that comprises: $SiO_2$ from about 35% to about 60%, $Al_2O_3$ from about 13% to about 30%, ZnO from about 0% to about 20%, $ZrO_2$ from about 0.1% to about 10%, and MgO from about 0.01% to about 20% (by mole of oxide).

According to aspect (15), the glass-ceramic of aspect (14) is provided, wherein the glass-ceramic further comprises at least one of: a CIE LAB L* value greater than about 90; a CIE LAB a* value of about −0.2 to about 0.2; and a CIE LAB b* value of about −0.1 to about 0.8, wherein L*, a*, and b* are each measured at an angle of incidence (AOI) of 10 degrees with a D65 illuminant at a wavelength range of 380 nm to 760 nm.

According to aspect (16), the glass-ceramic of aspect (14) or (15) is provided, further comprising at least one of: $Fe_2O_3$ at less than about 0.02% (by weight); and a ratio of an $Fe^{2+}$ content to a total iron content ($Fe^{2+}+Fe^{3+}$) of less than about 0.5.

According to aspect (17), the glass-ceramic of any one of aspects (14) to (16) is provided, further comprising at least one of: $TiO_2$ at about 0% to about 4% (by mole of oxide); and $Na_2O$ at greater than about 2% (by mole of oxide).

According to aspect (18), the glass-ceramic of any one of aspects (14) to (17) is provided, wherein the glass-ceramic is substantially free of BaO, the BaO at less than 0.01% (by mole of oxide).

According to aspect (19), the glass-ceramic of any one of aspects (14) to (18) is provided, wherein x is greater than zero.

According to aspect (20), the glass-ceramic of any one of aspects (14) to (19) is provided, wherein the glass-ceramic further comprises a maximum hardness of about 8 GPa to about 15 GPa, as measured by a Berkovich nanoindenter.

According to aspect (21), the glass-ceramic of any one of aspects (14) to (20) is provided, wherein the glass-ceramic further comprises a modulus of elasticity of about 90 GPa to about 120 GPa, as measured using resonant ultrasonic spectroscopy.

According to aspect (22), the glass-ceramic of any one of aspects (14) to (21) is provided, wherein the glass-ceramic further comprises at least one of: a haze value of less than about 0.7% for light having a wavelength of 300 nm; a haze value of less than about 0.5% for light having a wavelength of 350 nm; and a haze value of less than about 0.3% for light having a wavelength of 400 nm to 800 nm.

According to aspect (23), the glass-ceramic of any one of aspects (14) to (22) is provided, wherein the glass-ceramic further comprises at least one of: an axial transmittance of at least about 30% to light having a wavelength of 300 nm; an axial transmittance of at least about 65% to light having a wavelength of 350 nm; an axial transmittance of at least about 80% to light having a wavelength of 400 nm; an axial transmittance of at least about 85% to light having a wavelength of 450 nm; and an axial transmittance of at least about 85% to light having a wavelength of 500 nm to 800 nm.

According to aspect (24), a method of making a glass-ceramic is provided. The method comprises: forming a glass-ceramic precursor from a composition comprising: $SiO_2$ from about 35% to about 60%, $Al_2O_3$ from about 13% to about 30%, ZnO from about 0% to about 20%, $ZrO_2$ from about 0.1% to about 10%, and MgO from about 0.01% to about 20% (by mole of oxide); and heating the glass-ceramic precursor to form a glass-ceramic article comprising: a first crystal phase including $(Mg_xZn_{1-x})Al_2O_4$, where x is ≤1; and a second crystal phase including tetragonal $ZrO_2$. The glass-ceramic is substantially free of arsenic, tin, antimony, and cesium, such that arsenic, tin, antimony, and cesium are present at less than 0.01% (by mole of oxide), and the glass-ceramic is characterized by a transmittance of at least 80% to light having a wavelength of 380 nm to 760 nm.

According to aspect (25), the method of aspect (24) is provided, wherein a raw material source of the $SiO_2$ comprises less than 0.002% $Fe_2O_3$ (by weight).

According to aspect (26), the method of aspect (24) or (25) is provided, wherein the heating the glass-ceramic precursor comprises heating at a temperature of at least about 750° C. for a time period of at least about 30 minutes.

According to aspect (27), the method of any one of aspects (24) to (26) is provided, wherein the glass-ceramic further comprises at least one of: $Fe_2O_3$ at less than about 0.02% (by weight); and a ratio of an $Fe^{2+}$ content to a total iron content ($Fe^{2+}+Fe^{3+}$) of less than about 0.2.

According to aspect (28), the method of any one of aspects (24) to (27) is provided, wherein the glass-ceramic precursor composition further comprises at least one of: $TiO_2$ at about 0% to about 4% (by mole of oxide); and $Na_2O$ at greater than about 2% (by mole of oxide).

According to aspect (29), a glass-ceramic is provided. The glass-ceramic comprises: a silicate glass phase; a first crystal phase including $(Mg_xZn_{1-x})Al_2O_4$, where x is ≤1; and a second crystal phase including tetragonal $ZrO_2$. The glass-ceramic comprises a transmittance of at least about 80% to light having a wavelength of 380 nm to 760 nm. The glass-ceramic comprises at least one of: a CIE LAB L* value greater than about 90; a CIE LAB a* value of about −0.2 to about 0.2; and a CIE LAB b* value of about −0.1 to about 0.8, wherein L*, a*, and b* are each measured at an angle of incidence (AOI) of 10 degrees with a D65 illuminant at a wavelength range of 380 nm to 760 nm.

According to aspect (30), the glass-ceramic of aspect (29) is provided, wherein the glass-ceramic further comprises a crystallinity of at least about 10% (by weight).

According to aspect (31), the glass-ceramic of aspect (29) or (30) is provided, wherein the first crystal phase is further characterized by a crystallite size of less than about 20 nm.

According to aspect (32), the glass-ceramic of any one of aspects (29) to (31) is provided, wherein the glass-ceramic further comprises a maximum hardness of about 8 GPa to about 15 GPa, as measured by a Berkovich nanoindenter.

According to aspect (33), the glass-ceramic of any one of aspects (29) to (32) is provided, wherein the glass-ceramic further comprises a modulus of elasticity of about 90 GPa to about 120 GPa, as measured using resonant ultrasonic spectroscopy.

According to aspect (34), the glass-ceramic of any one of aspects (29) to (33) is provided, wherein the glass-ceramic further comprises at least one of: a haze value of less than about 0.7% for light having a wavelength of 300 nm; a haze value of less than about 0.5% for light having a wavelength of 350 nm; and a haze value of less than about 0.3% for light having a wavelength of 400 nm to 800 nm.

According to aspect (35), the glass-ceramic of any one of aspects (29) to (34) is provided, wherein the glass-ceramic further comprises at least one of: an axial transmittance of at least about 30% to light having a wavelength of 300 nm; an axial transmittance of at least about 65% to light having a wavelength of 350 nm; an axial transmittance of at least about 80% to light having a wavelength of 400 nm; an axial transmittance of at least about 85% to light having a wavelength of 450 nm; and an axial transmittance of at least about 85% to light having a wavelength of 500 nm to 800 nm.

According to aspect (36), the glass-ceramic of any one of aspects (29) to (35) is provided, wherein the glass-ceramic further comprises at least one of: an absorbance of less than about 0.5 absorbance units/millimeter (a.u./mm) for light having a wavelength of 300 nm; an absorbance of less than about 0.15 absorbance units/millimeter (a.u./mm) for light having a wavelength of 350 nm; and an absorbance of less than about 0.1 absorbance units/millimeter (a.u./mm) for light having a wavelength of 500 nm to 800 nm.

Additional features and advantages will be set forth in the detailed description which follows, and in part will be readily apparent to those skilled in the art from that description or recognized by practicing the aspects as described herein, including the detailed description which follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding, and are incorporated in and constitute part of this specification. The drawings illustrate one or more embodiments, and, together with the description, serve to explain the principles and operation of the various embodiments.

BRIEF DESCRIPTION OF THE DRAWINGS

These and other features, aspects, and advantages of the present disclosure are better understood when the following detailed description of the disclosure is read in reference to the accompanying drawings, in which.

DETAILED DESCRIPTION

Figure 1:
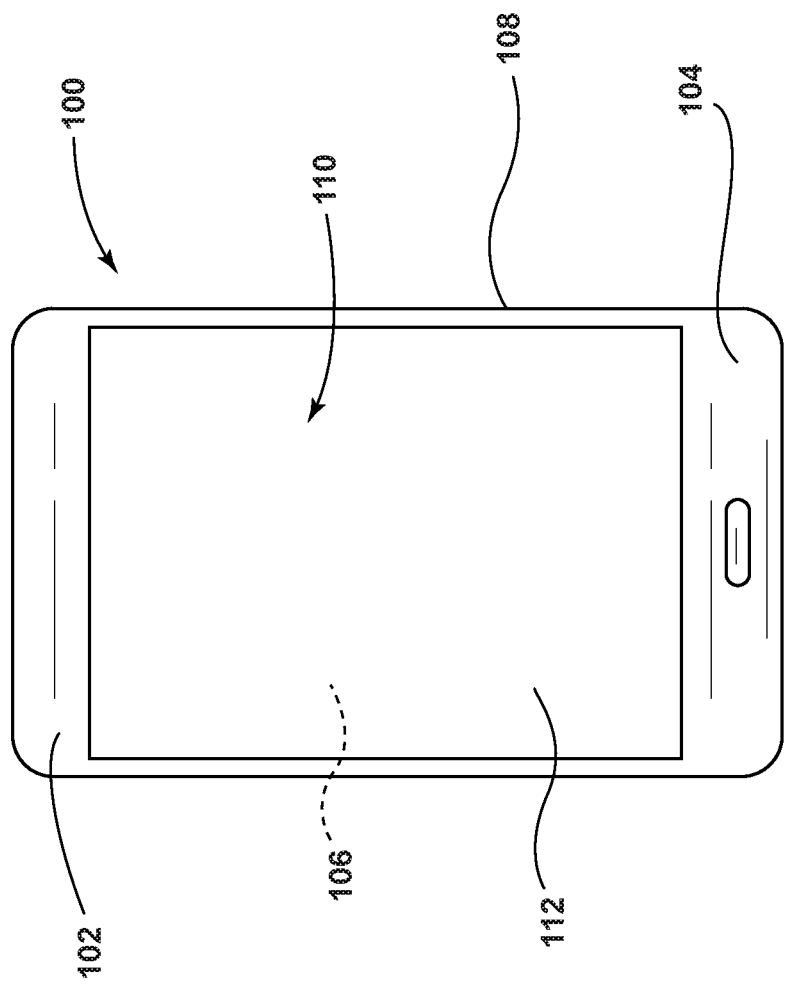
FIG. 1 is a plan view of an exemplary electronic device incorporating any of the articles disclosed herein, according to an aspect of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

The term "formed from" can mean one or more of comprises, consists essentially of, or consists of. For example, a component that is formed from a particular material can comprise the particular material, consist essentially of the particular material, or consist of the particular material.

As used herein, the terms "article," "glass-article," "ceramic-article," "glass-ceramics," "glass elements," "glass-ceramic article" and "glass-ceramic articles" may be used interchangeably, and in their broadest sense, to include any object made wholly or partly of glass and/or glass-ceramic material.

As used herein, a "glass state" refers to an inorganic amorphous phase material within the articles of the disclosure that is a product of melting that has cooled to a rigid condition without crystallizing. As used herein, a "glass-ceramic state" refers to an inorganic material within the articles of the disclosure which includes both the glass state and a "crystalline phase" and/or "crystalline precipitates" as described herein.

As used herein, "transmission", "transmittance", "optical transmittance" and "total transmittance" are used interchangeably in the disclosure and refer to external transmission or transmittance, which takes absorption, scattering and reflection into consideration. Fresnel reflection is not subtracted out of the transmission and transmittance values reported herein. In addition, any total transmittance values referenced over a particular wavelength range are given as an average of the total transmittance values measured over the specified wavelength range.

The elastic modulus (also referred to as Young's modulus) of the substrate is provided in units of gigaPascals (GPa). The elastic modulus of the substrate is determined by resonant ultrasound spectroscopy on bulk samples of the substrate.

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein, the language "substantially free," when used to describe a constituent of a composition, batch, melt, or article, refers to a constituent that is not actively added or batched into the composition, batch, melt, or article, but which may be present in a small amount of less than about 0.01% (by mole of oxide) as a contaminant and/or due to the inherent degree of uncertainty attributed to any measurement or analysis technique.

Aspects of the present disclosure relate to a glass-ceramic that includes a gahnite-spinel or gahnite crystal phase and a tetragonal $ZrO_2$ crystal phase, and which is transparent and substantially free of arsenic, tin, antimony, and cesium. As used herein, the phrase substantially free of arsenic, tin, antimony, and cesium refers to the arsenic, tin, antimony, and cesium being present at less than 0.01% (by mole of oxide). Gahnite and gahnite-spinel glass-ceramics often exhibit mechanical properties (e.g., hardness and elastic modulus) that make these materials suitable for use as a cover glass for displays or as a housing material for electronic devices. It is generally desirable that a material used as a cover glass for a display in an electronic device exhibit a high degree of transparency and a low level of color in order to minimize interference with the appearance and performance of the display. Conventional spinel-gahnite glass-ceramics often use decolorants, such as arsenic, tin, antimony, and/or cesium, to increase transparency and decrease the color of the glass-ceramic. Arsenic, tin, antimony, and cesium are also typically used as fining agents in forming a glass-ceramic. However, in some applications, it may be desirable to avoid the use of arsenic, tin, antimony, and cesium. Aspects of the present disclosure provide a glass-ceramic that includes a first crystal phase including $(Mg_xZn_{1-x})Al_2O_4$, where x is ≤1, and a second crystal phase including tetragonal $ZrO_2$, which is transparent and low in color without the use of arsenic, tin, antimony, and cesium. As used herein, the descriptive terms "first," "second," "third," ect. . . . , when used to describe a crystal phase are used for discussion purposes only and do not imply any particular order with respect to the formation of the described crystal phase. In addition, the glass-ceramics of the present disclosure can also be ion-exchangeable, which allows the glass-ceramic to be chemically strengthened when needed, depending on the end-use requirements of the glass-ceramic.

Referring to FIG. 1, the glass-ceramics disclosed herein may be incorporated into a device article such as a device article with a display (or display device articles), non-limiting examples of which include consumer electronics (including mobile phones, tablets, computers, navigation systems, wearable devices, such as watches, and the like), architectural device articles, transportation device articles (e.g., automotive, trains, aircraft, sea craft, etc.), appliance device articles, or any device article that benefits from some transparency, scratch-resistance, abrasion resistance, or a combination thereof. An exemplary device article incorporating any of the glass-ceramics disclosed herein is shown in FIG. 1. Specifically, FIG. 1 illustrates a consumer electronic device 100 including a housing 102 having front 104, back 106, and side surfaces 108. The device 100 includes electrical components (not shown) that are at least partially inside or entirely within the housing 102 and include at least a controller, a memory, and a display 110 at or adjacent to the front surface 104 of the housing 102. The device 100 can include a cover substrate 112 at or over the front surface 104 of the housing 102 such that it at least partially overlaps the display 110. According to one aspect, the cover substrate 112 may include any of the glass-ceramics disclosed herein. In some aspects, at least a portion of the housing 102 and/or the cover substrate 112 includes a glass-ceramic according to aspects of the present disclosure.

The glass-ceramic of the present disclosure includes a first crystal phase, a second crystal phase, and a residual glass phase. The first crystal phase may be the predominant crystal phase, defined herein as the crystal phase that accounts for the largest fraction of the glass-ceramic by weight. Accordingly, the second crystal phase may be present in a weight percent of the glass-ceramic that is less than the weight percent of the first crystal phase. In some aspects, the glass-ceramic may include one or more additional crystal phases.

The first crystal phase includes $(Mg_xZn_{1-x})Al_2O_4$, where x is less than or equal to 1 ($\leq 1$). The crystal phase $(Mg_xZn_{1-x})Al_2O_4$ may be referred to as a gahnite-spinel solid solution when $0 < x \leq 1$. When x is 0, the first crystal phase is pure gahnite. In some aspects, x is less than or equal to 1, x is less than or equal to 0.9, x is less than or equal to 0.8, x is less than or equal to 0.7, x is less than or equal to 0.6, x is less than or equal to 0.5, x is less than or equal to 0.4, x is less than or equal to 0.3, x is less than or equal to 0.2, x is less than or equal to 0.1, x is equal to 0, or any value for x between these values.

The second crystal phase includes tetragonal zirconia ($ZrO_2$). $ZrO_2$ is provided in the glass-ceramic precursor, as described in more detail below. Without being bound by any particular theory, it is believed that the tetragonal $ZrO_2$ crystal phase crystallizes before the $(Mg_xZn_{1-x})Al_2O_4$ crystal phase during ceramming, and may act as a nucleation site for the $(Mg_xZn_{1-x})Al_2O_4$ crystal phase. Additionally, when $TiO_2$ is included in the glass-ceramic precursor, it is believed that the $TiO_2$ partitions into the tetragonal $ZrO_2$ phase.

One or both of the first and second crystal phases may have a crystallite size that is less than about 20 nm. In some aspects, one or both of the first and second crystal phases may have a crystallite size that is less than about 20 nm, less than about 15 nm, less than about 10 nm, or less than about 5 nm. For example, one or both of the first and second crystal phases may have a crystallite size that is about 1 nm to about 20 nm, about 1 nm to about 15 nm, about 1 nm to about 10 nm, about 1 nm to about 5 nm, about 5 nm to about 20 nm, about 5 nm to about 15 nm, about 5 nm to about 10 nm, about 10 nm to about 20 nm, or about 10 nm to about 15 nm. In some examples, the first crystal phase may have a crystallite size that is about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or any size between these values. In some examples, the second crystal phase may have a crystallite size that is about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or any size between these values. Without being bound by any theory, it is believed that smaller crystallite size increases transparency of the glass-ceramic compared to larger crystallite sizes. Crystallite size as used herein is determined by powder x-ray diffraction (XRD) analysis with a scan from 5 to 80 degrees, unless otherwise specified. The crystallite size was estimated using the Scherrer equation function available in MDI Jade, the software package utilized for phase identification and quantitative analysis. However, it is understood that different methods and instrumentation for determining crystallite size can also be employed with any necessary scaling.

The glass-ceramic of the present disclosure can be characterized by a total crystallinity of at least about 10% by weight (wt %). As used herein, total crystallinity refers to the sum of the wt % of all the crystal phases present in the glass-ceramic. In some aspects, the glass-ceramic of the present disclosure includes a total crystallinity of at least about 10 wt %, at least about 15 wt %, at least about 20 wt %, at least about 25 wt %, at least about 30 wt %, at least about 35 wt %, at least about 40 wt %, at least about 45 wt %, or at least about 50 wt %. For example, the glass-ceramic of the present disclosure includes a total crystallinity of about 10 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, about 15 wt % to about 50 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 50 wt %, about 30 wt % to about 45 wt %, about 30 wt % to about 40 wt %, about 30 wt % to about 35 wt %, about 35 wt % to about 50 wt %, about 35 wt % to about 45 wt %, about 35 wt % to about 40 wt %, or about 40 wt % to about 50 wt %. In some examples, the glass-ceramic of the present disclosure includes a total crystallinity of about 10 wt %, about 15 wt %, about 20 wt %, about 25 wt %, about 30 wt %, about 35 wt %, about 40 wt %, about 45, about 50 wt %, or any total crystallinity value between these values. Without being limited by any theory, it is believed that the total crystallinity of the glass-ceramics of the present disclosure is high enough to contribute to providing the glass-ceramic with the desired mechanical properties, such as hardness and elastic modulus, while also being low enough to provide the desired transparency. The total crystallinity of the glass-ceramic is determined through Rietveld quantitative analysis of the XRD data gathered as described above with respect to the crystallite size of the first and second crystal phases. The Rietveld quantitative analysis method employs a least squares method to model the XRD data and then determines the concentration of phases in the sample based on known lattice and scale factors for the identified phases. However, it is understood that different methods and instrumentation for determining total crystallinity can also be employed with any necessary scaling.

The glass-ceramics of the present disclosure can have an axial transmittance of at least 80% to light having a wavelength of 380 nm to 760 nm. As used herein, the glass-ceramics of the present disclosure are referred to as transparent when exhibiting an axial transmittance of at least 80% to light having a wavelength of 380 nm to 760 nm. In some aspects, the glass-ceramics of the present disclosure can have an axial transmittance to light having a wavelength of 380 nm to 760 nm of at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, or any % axial transmittance between these values. In some examples, the glass-ceramics of the present disclosure have an axial transmittance of at least about 30% to light having a wavelength of 300 nm, at least about 65% to light having a wavelength of 350 nm, at least about 80% to light having a wavelength of 400 nm, at least about 85% to light having a wavelength of about 450 nm, and/or at least about 85% to light having a wavelength of 500 nm to 800 nm.

The axial transmittance is determined by subtracting the diffuse transmittance from the total transmittance. The total transmittance can be measured with a Perkin Elmer Lambda 950 UV/VIS/NIR spectrophotometer with a 150 mm integrating sphere. The samples were mounted at the sphere's entrance port, allowing for collection of wide angle scattered light. The total transmittance data was collected with the reference Spectralon reflectance disc over the sphere's exit port. The percent of total transmittance was calculated relative to an open beam baseline measurement. It is understood that different methods and instrumentation for determining axial transmittance can also be employed with any necessary scaling.

The glass-ceramics of the present disclosure can also be characterized by a low absorbance of less than about 0.2 absorbance units per millimeter (a.u./mm) for light having a wavelength of 380 nm to 800 nm. For example, the glass-ceramics of the present disclosure can have an absorbance of less than about 0.2 a.u./mm, less than about 0.15 a.u./mm, less than about 1.0 a.u./mm, less than about 0.75 a.u./mm, less than about 0.5 a.u./mm, less than about 0.25 a.u./mm, or less than about 0.15 a.u./mm for light having a wavelength of 380 nm to 800 nm. In some examples, the glass-ceramics of the present disclosure can have an absorbance of less than about 0.5 a.u./mm for light having a wavelength of 300 nm, less than about 0.15 a.u./mm for light having a wavelength of 350 nm, and/or less than about 0.1 a.u./mm for light having a wavelength of 500 nm to 800 nm. The absorbance values for the samples were determined from the transmittance measurements according to the formula: absorbance= $(2-\text{Log}_{10}(\%\text{ total transmittance}))/(\text{sample thickness})$.

The glass-ceramics of the present disclosure can also be characterized by a haze value of less than about 0.7% for light having a wavelength of 380 nm to 800 nm. As used herein, a material's haze value is defined as the percent transmission of light which deviates by greater than 2.5 degrees from the angle of incident light. In some examples, the glass-ceramics of the present disclosure can be characterized by a haze value of less than about 0.7%, less than about 0.6%, less than 0.5%, less than 0.4%, less than 0.3%, less than about 0.2% for light having a wavelength of 380 nm to 800 nm. For example, the glass-ceramics of the present disclosure can be characterized by a haze value of less than about 0.7% for light having a wavelength of 300 nm, a haze value of less than about 0.5% for light having a wavelength of 350 nm, and/or a haze value of less than about 0.3% for light having a wavelength of 400 nm to 800 nm. Without being limited by any theory, as the haze value of a material increases, the extent to which the material interferes with visibility through the material may also increase. For example, when the glass-ceramics of the present disclosure are used in a display of an electronic device, haze can result in a blurred image and/or the loss of light intensity due to the scattering of the reflected and/or transmitted light beams through the glass-ceramic display. Generally, it is desirable to minimize haze in order to not negatively affect the visual clarity and/or brightness (due to light loss) in optical applications. The haze values of the samples were determined from the transmittance measurements according to the formula: % haze=$(T_{Diffuse\ Corrected}/T_{total})*100$. $T_{Diffuse\ Corrected}$ is the diffuse transmittance corrected to remove specular transmittance and $T_{total}$ is the total transmittance.

In some aspects, the glass-ceramics of the present disclosure can be substantially colorless. As used herein, the glass-ceramics of the present disclosure are considered substantially colorless when the color coordinate a* has a value of about −0.2 to about 0.2, the color coordinate b* has a value of about −0.1 to about 0.8, and an L* value of greater than about 90. An L* value of 0 in CIELAB color space represents the darkest black and an L* value of 100 is indicative of the brightest white. The a* color coordinate in color space is representative of the green-red color component, with negative a* values corresponding to green and positive a* values corresponding to red. The b* color coordinate in color space is representative of the blue-yellow component, with negative b* values corresponding to blue and positive b* values corresponding to yellow. The closer the a* and b* values are to the origin, the more neutral in color the glass-ceramic will appear to an observer. The neutral color in combination with a high L* value can contribute to the substantially colorless appearance of the glass-ceramics of the present disclosure.

The color coordinates a* and b* and lightness value L* for the materials of the present disclosure were measured using a UV/Vis/NIR spectrophotometer configured with an integrating sphere. The measurement was carried out over a wavelength of 380 nm to 760 nm with a 2 nm interval with a D65 series illuminant at an incident angle of 10 degrees. Other working optical ranges and illuminants can also be employed to determine the color coordinates of a material with any necessary scaling. The procedures for determining the color space in the CIE system are described in more detail in "Standard practice for computing the colors of objects by using the CIR system" (ASTM E308-08).

The glass-ceramics of the present disclosure can have a maximum hardness of greater than about 8 gigapascals (GPa), as measured by a Berkovich nanoindenter. For example, the glass-ceramic can have a hardness of greater than 8 GPa, greater than 9 GPa, greater than 10 GPa, greater than 11 GPa, greater than 12 GPa, greater than 13 GPa, greater than 14 GPa, or greater than 15 GPa. In some examples, the glass-ceramic can have a hardness of from about 8 GPa to about 15 GPa, about 8 GPa to about 14 GPa, about 8 GPa to about 13 GPa, about 8 GPa to about 12 GPa, about 8 GPa to about 11 GPa, about 8 GPa to about 10 GPa, about 9 GPa to about 15 GPa, about 9 GPa to about 14 GPa, about 9 GPa to about 13 GPa, about 9 GPa to about 12 GPa, about 9 GPa to about 11 GPa, about 9 GPa to about 10 GPa, about 10 GPa to about 15 GPa, about 10 GPa to about 14 GPa, about 10 GPa to about 13 GPa, about 10 GPa to about 12 GPa, about 10 GPa to about 11 GPa, about 11 GPa to about 15 GPa, about 11 GPa to about 14 GPa, about 11 GPa to about 13 GPa, about 11 GPa to about 12 GPa, about 12 GPa to about 15 GPa, about 12 GPa to about 14 GPa, about 12 GPa to about 13 GPa, about 13 GPa to about 15 GPa, about 13 GPa to about 14 GPa, or about 14 GPa to about 15 GPa. For example, the glass-ceramic can have a hardness of about 8 GPa, about 9 GPa, about 10 GPa, about 11 GPa, about 12 GPa, about 13 GPa, about 14 GPa, about 15 GPa, or any hardness value between these values.

The hardness of the present glass-ceramics was measured with a nanoindenter and is reported in gigapascals (GPa), unless stated otherwise. The nanoindenter measurement was performed using a diamond Berkovich tip using the continuous stiffness method as implemented with an Agilent G200 nanoindenter. The continuous stiffness method utilizes a small sinusoidal displacement signal (1 nm amplitude at 45 Hz) superimposed on the tip as it is loaded into the sample surface, and the load, depth, and contact stiffness are continuously determined. While not being bound by any theory, it is believed that the hardness of the glass-ceramics of the present disclosure may be due at least in part to the hardness of the first crystal phase, the $(Mg_xZn_{1-x})Al_2O_4$ phase, and the secondary crystal phase, the tetragonal $ZrO_2$ phase, contained therein.

The glass-ceramics of the present disclosure may have an elastic modulus of from about 90 GPa to about 120 GPa. In some examples, the glass-ceramics of the present disclosure have an elastic modulus of greater than 90 GPa, greater than 95 GPa, greater than 100 GPa, greater than 105 GPa, greater than 110 GPa, greater than 115 GPa, or greater than 120 GPa. In some examples, the elastic modulus is from about 90 GPa to about 120 GPa, about 90 GPa to about 115 GPa, about 90 GPa to about 110 GPa, about 90 GPa to about 105 GPa, about 90 GPa to about 100 GPa, about 95 GPa to about 120 GPa, about 95 GPa to about 115 GPa, about 95 GPa to about 110 GPa, about 95 GPa to about 105 GPa, about 95 GPa to about 100 GPa, about 100 GPa to about 120 GPa, about 100 GPa to about 115 GPa, about 100 GPa to about 110 GPa, about 100 GPa to about 105 GPa, about 105 GPa to about 120 GPa, about 105 GPa to about 115 GPa, about 105 GPa to about 110 GPa, about 110 GPa to about 120 GPa, about 100 GPa to about 115 GPa, about 115 GPa to about 120 GPa. For example, the elastic modulus can be about 90 GPa, about 95 GPa, about 100 GPa, about 105 GPa, about 106 GPa, about 107 GPa, about 108 GPa, about 109 GPa, about 110 GPa, about 111 GPa, about 112 GPa, about 113 GPa, about 114 GPa, about 115 GPa, about 120 GPa, or any elastic modulus values between these values. The elastic modulus of the glass-ceramics of the present disclosure were determined by a resonant ultrasonic spectroscopy technique of the general type set forth in ASTM E2001-13, titled "Standard Guide for Resonant Ultrasound Spectroscopy for Defect Detection in Both Metallic and Non-metallic Parts," and are reported in GPa, unless otherwise specified.

The glass-ceramics of the present disclosure, may have a strain point and an anneal point high enough to allow additional processing of the glass-ceramic at temperatures of up to about 800° C. without detrimental effect on the structural integrity of the glass ceramic. This additional processing may include chemical strengthening, such as ion exchange. These elevated processing temperatures may increase the efficiency of additional processing, such as by reducing the time necessary for the additional processing. In some examples, the strain point may be less than or equal to about 900° C. For example, the strain point may be from about 750° C. to about 900° C., about 800° C. to about 900° C., about 825° C. to about 900° C., about 850° C. to about 900° C., about 750° C. to about 850° C., about 800° C. to about 850° C., about 825° C. to about 850° C., about 750° C. to about 825° C., or about 800° C. to about 825° C. In some examples, the strain point may be about 800° C., about 810° C., about 820° C., about 821° C., about 822° C., about 823° C., about 824° C., about 825° C., about 840° C., about 841° C., about 842° C., about 843° C., about 844° C., about 845° C., about 846° C., about 847° C., about 848° C., about 849° C., about 850° C., or any strain points between these values. The strain points may allow for improved thermal stability and a larger potential temperature range for ion exchange treatments. If the strain point is too low, the additional processing of the glass-ceramic may become difficult. If the strain point is too high, the manufacturing of the precursor glass-ceramics may become challenging.

The glass-ceramics of the present disclosure can be derived from a glass-ceramic precursor that includes $SiO_2$ and $Al_2O_3$ and optionally one or more of ZnO, $ZrO_2$, and MgO. Additional optional components may include $TiO_2$, $Na_2$, and BaO. The amounts of constituent components of the glass-ceramics and glass-ceramic precursors are provided in mole percent (mol %) on an oxide basis, unless otherwise specified. The glass-ceramic precursors of the present disclosure can be substantially free of arsenic, tin, antimony, and cesium (i.e., present at less than 0.01 mol %), thus forming a glass-ceramic that is substantially free of arsenic, tin, antimony, and cesium.

The glass-ceramic precursors of the present disclosure can include $SiO_2$ in an amount of from about 35% to about 60% (by mole of oxide) such that the glass phase is a silicate (e.g. aluminosilicate, borosilicate, soda lime). For example, the $SiO_2$ can be present in an amount of from about 35 mol % to about 60 mol %, about 35 mol % to about 55 mol %, about 35 mol % to about 50 mol %, about 35 mol % to about 45 mol %, about 35 mol % to about 40 mol %, about 40 mol % to about 60 mol %, about 40 mol % to about 55 mol %, about 40 mol % to about 50 mol %, about 40 mol % to about 45 mol %, about 45 mol % to about 60 mol %, about 45 mol % to about 55 mol %, about 45 mol % to about 50 mol %, about 50 mol % to about 60 mol %, about 50 mol % to about 55 mol %, or about 55 mol % to about 60 mol %. In some examples, the $SiO_2$ can be present in an amount of about 35 mol %, about 40 mol %, about 45 mol %, about 50 mol %, about 51 mol %, about 52 mol %, about 53 mol %, about 54 mol %, about 55 mol %, about 56 mol %, about 57 mol %, about 58 mol %, about 59 mol %, about 60 mol %, or any amount of $SiO_2$ between these values. Without being bound by any theory, pure $SiO_2$ has a relatively low coefficient of thermal expansion and is alkali free but has a high melting point. It is believed that if the concentration of $SiO_2$ in the glass-ceramic precursor is too high, the formability of the precursor glass composition used to form the glass-ceramics may be diminished as higher concentrations of $SiO_2$ increase the difficulty of melting the glass, which, in turn, may adversely impact the formability of the glass-ceramic precursor.

The glass-ceramic precursor may include $Al_2O_3$ in an amount of from about 13% to about 30% (by mole of oxide). For example, the $Al_2O_3$ can be present in an amount of from about 13 mol % to 30 mol %, about 15 mol % to about 30 mol %, about 18 mol % to about 30 mol %, about 20 mol % to about 30 mol %, about 22 mol % to about 30 mol %, about 24 mol % to about 30 mol %, about 26 mol % to about 30 mol %, about 13 mol % to 28 mol %, about 15 mol % to about 28 mol %, about 18 mol % to about 28 mol %, about 20 mol % to about 28 mol %, about 22 mol % to about 28 mol %, about 24 mol % to about 28 mol %, about 26 mol % to about 28 mol %, about 13 mol % to about 26 mol %, about 15 mol % to about 26 mol %, about 18 mol % to about 26 mol %, about 20 mol % to about 26 mol %, about 22 mol % to about 26 mol %, about 24 mol % to about 26 mol %, about 13 mol % to about 24 mol %, about 15 mol % to about 24 mol %, about 18 mol % to about 24 mol %, about 20 mol % to about 24 mol %, about 22 mol % to about 24 mol %, about 13 mol % to about 22 mol %, about 15 mol % to about 22 mol %, about 18 mol % to about 22 mol %, about 20 mol % to about 22 mol %, about 13 mol % to about 20 mol %, about 15 mol % to about 20 mol %, or about 18 mol % to about 20 mol %. In some examples, the $Al_2O_3$ can be present in an amount of about 13 mol %, about 15 mol %, about 18 mol %, about 19 mol %, about 20 mol %, about 21 mol %, about 22 mol %, about 24 mol %, about 26 mol %, about 28 mol %, about 30 mol %, or any amount of $Al_2O_3$ between these values. Without being bound by any theory, $Al_2O_3$ may increase the viscosity of the glass-ceramic precursors used to form the glass-ceramics due to its tetrahedral coordination in a glass melt, which may decrease the formability of the glass-ceramic precursor composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the precursor melt, thereby enhancing the liquidus viscosity and improving the compatibility of the precursor composition with certain forming processes, such as a fusion forming process. The $Al_2O_3$ in the glass-ceramic precursor also provides the aluminum necessary to form the gahnite-spinel crystal phase when the precursor is cerammed to form a glass-ceramic.

The glass-ceramic precursors of the present disclosure may also include ZnO. The ZnO in the precursor supplies the zinc necessary to form the gahnite-spinel crystal phase when the precursor is cerammed to form the glass-ceramic. When present, the glass-ceramic precursor may include ZnO from about 0% to about 20% (by mole of oxide). For example, the glass-ceramic precursor may include ZnO from about 0 mol % to about 20 mol %, about 2.5 mol % to about 20 mol %, about 5 mol % to about 20 mol %, about 7.5 mol % to about 20 mol %, about 10 mol % to about 20 mol %, about 12.5 mol % to about 20 mol %, about 15 mol % to about 20 mol %, about 17.5 mol % to about 20 mol %, 0 mol % to about 17.5 mol %, about 2.5 mol % to about 17.5 mol %, about 5 mol % to about 17.5 mol %, about 7.5 mol % to about 17.5 mol %, about 10 mol % to about 17.5 mol %, about 12.5 mol % to about 17.5 mol %, about 15 mol % to about 17.5 mol %, 0 mol % to about 15 mol %, about 2.5 mol % to about 15 mol %, about 5 mol % to about 15 mol %, about 7.5 mol % to about 15 mol %, about 10 mol % to about 15 mol %, about 12.5 mol % to about 15 mol %, 0 mol % to about 12.5 mol %, about 2.5 mol % to about 12.5 mol %, about 5 mol % to about 12.5 mol %, about 7.5 mol % to about 12.5 mol %, about 10 mol % to about 12.5 mol %, 0 mol % to about 10 mol %, about 2.5 mol % to about 10 mol %, about 5 mol % to about 10 mol %, about 7.5 mol % to about 10 mol %, 0 mol % to about 7.5 mol %, about 2.5 mol % to about 7.5 mol %, about 5 mol % to about 7.5 mol %, 0 mol % to about 5 mol %, about 2.5 mol % to about 5 mol %, or about 2.5 mol % to about 5 mol %. In some examples, the glass-ceramic precursor may include ZnO at about 0 mol %, about 2.5 mol %, about 5 mol %, about 7.5 mol %, about 10 mol %, about 12.5 mol %, about 15 mol %, about 17.5 mol %, about 20 mol %, or any amount of ZnO between these values.

The glass-ceramic precursors of the present disclosure may further comprise MgO. The MgO in the precursor supplies the magnesium necessary to form a spinel solid solution containing crystal phase when the precursor is cerammed to form the glass-ceramics of the present disclosure. The glass-ceramic precursors can include MgO from about 0.01% to about 20% (by mole of oxide). For example, the MgO can be present from about 0.01 mol % to about 20 mol %, about 0.1 mol % to about 20 mol %, about 1 mol % to about 20 mol %, about 5 mol % to about 20 mol %, about 10 mol % to about 20 mol %, about 15 mol % to about 20 mol %, about 0.01 mol % to about 15 mol %, about 0.1 mol % to about 15 mol %, about 1 mol % to about 15 mol %, about 5 mol % to about 15 mol %, about 10 mol % to about 15 mol %, about 0.01 mol % to about 10 mol %, about 0.1 mol % to about 10 mol %, about 1 mol % to about 10 mol %, about 5 mol % to about 10 mol %, about 0.01 mol % to about 5 mol %, about 0.1 mol % to about 5 mol %, about 1 mol % to about 5 mol %, about 0.01 mol % to about 0.1 mol %, about 0.01 mol % to about 1 mol %, or about 0.1 mol % to about 1 mol %. In some examples, the MgO can be present at about 0.01 mol %, about 0.02 mol %, about 0.03 mol %, about 0.04 mol %, about 0.05 mol %, about 1 mol %, about 2 mol %, about 5 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, about 19 mol %, about 20 mol %, or any amount of MgO between these values.

The glass-ceramic precursors of the present disclosure also includes $ZrO_2$. The $ZrO_2$ in the precursor supplies the zirconium to form the tetragonal $ZrO_2$ crystal phase when the precursor is cerammed to form the glass-ceramic. In addition, the $ZrO_2$ may acts as a nucleating agent, and in some cases may be the sole nucleating agent in the precursor composition. The glass-ceramic precursors can include $ZrO_2$ from about 0.01% to about 10% (by mole oxide). For example, the $ZrO_2$ can be present in an amount of from about 0.01 mol % to about 10 mol %, about 0.1 mol % to about 10 mol %, about 1 mol % to about 10 mol %, about 2 mol % to about 10 mol %, about 5 mol % to about 10 mol %, about 8 mol % to about 10 mol %, about 0.01 mol % to about 8 mol %, about 0.1 mol % to about 8 mol %, about 1 mol % to about 8 mol %, about 2 mol % to about 8 mol %, about 5 mol % to about 10 mol %, about 0.01 mol % to about 5 mol %, about 0.1 mol % to about 5 mol %, about 1 mol % to about 5 mol %, about 2 mol % to about 5 mol %, about 0.01 mol % to about 2 mol %, about 0.1 mol % to about 2 mol %, about 1 mol % to about 2 mol %, about 0.01 mol % to about 1 mol %, or about 0.1 mol % to about 1 mol %. In some examples, the $ZrO_2$ can be present in an amount of about 0.01 mol %, about 0.1 mol %, about 1 mol %, about 2 mol %, about 3 mol %, about 4 mol %, about 5 mol %, about 6 mol %, about 7 mol %, about 8 mol %, about 9 mol %, about 10 mol %, or any amount of $ZrO_2$ between these values.

The glass-ceramic precursors of the present disclosure may include one or more nucleating agents. The nucleating agents are believed to facilitate the formation of nuclei in the precursor compositions utilized to form the glass-ceramics. In some examples, the nucleating agents allow the glass ceramics to be cerammed without a separate nucleation step. The nucleating agents may be selected from $ZrO_2$, $TiO_2$, $Eu_2O_3$, $Ta_2O_5$, and/or $La_2O_3$. As discussed above, in some examples, $ZrO_2$ is the only nucleating agent. In other examples, alternative or additional nucleating agent(s) may be used in the precursor compositions. In some examples, a total amount of nucleating agents in the glass-ceramic precursor may be an amount greater than or equal to 0 mol %, such as greater than or equal to about 1 mol %, greater than or equal to about 2 mol %, greater than or equal to about 3 mol %, greater than or equal to about 4 mol %, greater than or equal to about 5 mol %, or more. In some examples, a total amount of nucleating agents in the glass-ceramic precursor may be an amount less than or equal to about 6 mol %, such as less than or equal to about 5 mol %, less than or equal to about 4 mol %, less than or equal to about 3 mol %, less than or equal to about 2 mol %, less than or equal to about 1 mol %, or less. For example, a total amount of nucleating agents in the glass-ceramic precursor may be an amount from about 0 mol % to about 6 mol %, about 1 mol % to about 5 mol %, about 2 mol % to about 4 mol %, about 1 mol % to about 3 mol %, or about 2 mol % to about 5 mol %. In some examples a total amount of nucleating agents present in the glass-ceramic precursor is about 0.01 mol %, about 1 mol %, about 2 mol %, about 3 mol %, about 4 mol %, about 5 mol %, about 6 mol %, or any amount of total nucleating agents between these values.

The glass-ceramic precursors of the present disclosure may include $TiO_2$ as a nucleating agent. Without being bound by any theory, when the amount of $TiO_2$ is too high, the resulting glass-ceramic may have an undesirable colored appearance. $TiO_2$ can contribute to the glass-ceramic having a yellow or brown appearance. It is believed that the reduction of $Ti^{4+}$ to $Ti^3$ may be responsible for the yellow or brown colored appearance of the glass ceramic. In some examples, the amount of $TiO_2$ in the glass-ceramic precursor may be from about 0% to about 4% (by mole of oxide). For example, the $TiO_2$ may be present in an amount of from about 0 mol % to about 4 mol %, about 0.01 mol % to about 4 mol %, about 0.05 mol % to about 4 mol %, about 0.1 mol % to about 4 mol %, about 0.5 mol % to about 4 mol %, about 1 mol % to about 4 mol %, about 2 mol % to about 4 mol %, about 3 mol % to about 4 mol %, about 0 mol % to about 3 mol %, about 0.01 mol % to about 3 mol %, about 0.05 mol % to about 3 mol %, about 0.1 mol % to about 3 mol %, about 0.5 mol % to about 3 mol %, about 1 mol % to about 3 mol %, about 2 mol % to about 3 mol %, 0 mol % to about 2 mol %, about 0.01 mol % to about 2 mol %, about 0.05 mol % to about 2 mol %, about 0.1 mol % to about 2 mol %, about 0.5 mol % to about 2 mol %, about 1 mol % to about 2 mol %, 0 mol % to about 1 mol %, about 0.01 mol % to about 1 mol %, about 0.05 mol % to about 1 mol %, about 0.1 mol % to about 1 mol %, about 0.5 mol % to about 1 mol %, 0 mol % to about 0.5 mol %, about 0.01 mol % to about 0.5 mol %, about 0.05 mol % to about 0.5 mol %, about 0.1 mol % to about 0.5 mol %, 0 mol % to about 0.1 mol %, about 0.01 mol % to about 0.1 mol %, or about 0.05 mol % to about 0.1 mol %. In some examples, the $TiO_2$ may be present in an amount of about 0 mol %, about 0.01 mol %, about 0.05 mol %, about 0.1 mol %, about 0.5 mol %, about 1 mol %, about 2 mol %, about 3 mol %, about 4 mol %, or any amount of $TiO_2$ between these values. In some examples, the glass-ceramic precursor is substantially free or free of $TiO_2$.

The glass-ceramic precursor may include one or more alkali metal oxides. The alkali metal oxides can facilitate the chemical strengthening of the glass-ceramics of the present disclosure, such as through an ion exchange process. The sum of the alkali metal oxides (e.g., $Li_2O$, $Na_2$, and $K_2O$ as well as other alkali metal oxides including $Cs_2O$ and $Rb_2O$) in the glass-ceramic precursor may be referred to as "$R_2O$", and $R_2O$ may be expressed in mol %. In some examples, the glass-ceramic precursor may include a mixture of alkali metal oxides, such as a combination of $Li_2O$ and $Na_2$, a combination of $Na_2O$ and $K_2O$, a combination of $Li_2O$ and $K_2O$, or a combination of $Li_2O$, $Na_2O$, and $K_2O$. In some examples, the glass-ceramic precursor contains at least one of $Li_2O$ and $Na_2O$. The inclusion of a mixture of alkali metal oxides in the glass-ceramic precursor may facilitate the ion exchange during chemical strengthening of the glass-ceramics of the present disclosure. Without being bound by any theory, it is believed that the alkali metal oxides segregate into the residual glass phase of the glass-ceramic upon ceramming.

The presence of lithium in the glass-ceramic can facilitate an ion exchange process and may also reduce the softening point of the precursor composition. In some examples, the precursor composition includes $Li_2O$ in an amount of from about 0% to about 5% (by mole of oxide). For example, the $Li_2O$ can be present in an amount of from about 0 mol % to about 5 mol %, about 0 mol % to about 4 mol %, about 0 mol % to about 3 mol %, about 0 mol % to about 2 mol %, about 0 mol % to about 1 mol %, about 1 mol % to about 5 mol %, about 1 mol % to about 4 mol %, about 1 mol % to about 3 mol %, about 1 mol % to about 2 mol %, about 2 mol % to about 5 mol %, about 2 mol % to about 4 mol %, about 2 mol % to about 3 mol %, about 3 mol % to about 5 mol %, about 3 mol % to about 4 mol %, or about 4 mol % to about 4 mol %. In some examples, the $Li_2O$ is present in an amount of about 0 mol %, about 1 mol %, about 2 mol %, about 3 mol %, about 4 mol %, about 5 mol %, or any amount of $Li_2O$ between these values. In some examples, the precursor composition is substantially free of $Li_2O$.

$Na_2O$ may also facilitate the ion exchangeability of the glass-ceramics of the present disclosure. $Na_2O$ can also decrease the melting point of the precursor composition and improve the formability of the precursor composition. The glass-ceramic precursor can include $Na_2O$ in an amount of greater than about 2% (by mole of oxide). In some examples, the $Na_2O$ is present in an amount of from about 2 mol % to about 10 mol %, about 2 mol % to about 9 mol %, about 2 mol % to about 8 mol %, about 2 mol % to about 7 mol %, about 2 mol % to about 6 mol %, about 2 mol % to about 5 mol %, about 2 mol % to about 4 mol %, about 3 mol % to about 10 mol %, about 3 mol % to about 9 mol %, about 3 mol % to about 8 mol %, about 3 mol % to about 7 mol %, about 3 mol % to about 6 mol %, about 3 mol % to about 5 mol %, about 3 mol % to about 4 mol %, about 4 mol % to about 10 mol %, about 4 mol % to about 9 mol %, about 4 mol % to about 8 mol %, about 4 mol % to about 7 mol %, about 4 mol % to about 6 mol %, about 4 mol % to about 5 mol %, about 5 mol % to about 10 mol %, about 5 mol % to about 9 mol %, about 5 mol % to about 8 mol %, about 5 mol % to about 7 mol %, about 5 mol % to about 6 mol %, about 6 mol % to about 10 mol %, about 6 mol % to about 9 mol %, about 6 mol % to about 8 mol %, about 6 mol % to about 7 mol %, or 7 mol % to about 10 mol %. For example, the $Na_2O$ can be present in an amount of about 2 mol %, about 3 mol %, about 4 mol %, about 5 mol %, about 6 mol %, about 7 mol %, about 8 mol %, about 9 mol %, about 10 mol %, or any amount of $Na_2O$ between these values.

Optionally, the glass-ceramic precursor may include BaO. Without being limited by any theory, the inclusion of BaO in the glass-ceramic may increase the refractive index of the residual glass phase in the glass-ceramic. The BaO may be added to the precursor to facilitate maintaining the oxidization state of the system during melting, which may prevent the reduction of $Ti^{4+}$ to $Ti^{3+}$ when $TiO_2$ is present in the composition. It is believed that the BaO may act to prevent undesirable coloration of the glass ceramics due to the presence of $TiO_2$. In some examples, the glass-ceramic precursor may include BaO in an amount of from about 0% to about 2% (by mole of oxide). For example, the BaO may be present in an amount of from about 0 mol % to about 2 mol %, about 0 mol % to about 1.5 mol %, about 0 mol % to about 1 mol %, about 0 mol % to about 0.5 mol %, about 0.5 mol % to about 2 mol %, about 0.5 mol % to about 1.5 mol %, about 0.5 mol % to about 1 mol %, about 1 mol % to about 2 mol %, about 1 mol % to about 1.5 mol %, or about 1.5 mol % to about 2 mol %. In some examples, the BaO is present at about 0 mol %, about 0.5 mol %, about 1 mol %, about 1.5 mol %, about 2 mol %, or any amount of BaO between these values. In some examples, the precursor composition is substantially free of BaO.

The glass-ceramic precursor can include a low amount of iron such that the glass-ceramic of the present disclosure has a low amount of iron. Without being bound by any theory, it is believed that a low amount of iron oxide ($Fe_2O_3$) in the glass-ceramic precursor composition facilitates formation of a glass-ceramic that is transparent and substantially colorless, as described herein. Thus, according to one aspect of the present disclosure iron oxide is not purposefully added as a constituent component to the glass-ceramic precursor. However, iron oxide may be present in small amounts as an impurity in a raw material source of one of the other components of the glass-ceramic precursor composition or may be present as a contaminant. For example, small amounts of $Fe_2O_3$ may be present in the $SiO_2$ used to form the glass-ceramic precursor, which may vary depending on the source of the $SiO_2$. According to one aspect of the present disclosure, the raw material source of the $SiO_2$, and any other component which may introduce $Fe_2O_3$ as an impurity, may be selected to provide the glass-ceramic precursor and/or the formed glass-ceramic with the desired iron content.

According to one aspect of the present disclosure, the amount of $Fe_2O_3$ present in the glass-ceramic precursor is less than about 0.02% (by weight). For example, the $Fe_2O_3$ can be present in the glass-ceramic precursor in an amount of less than about 0.02 wt %, less than about 0.01 wt %, less than about 0.005 wt %, less than about 0.002 wt %, or less than about 0.001 wt %. In some examples, the $Fe_2O_3$ can be present in the glass-ceramic precursor in an amount of from about 0 wt % to about 0.02 wt %, about 0 wt % to about 0.01 wt %, about 0 wt % to about 0.005 wt %, about 0 wt % to about 0.002 wt %, about 0 wt % to about 0.001 wt %, about 0.001 wt % to about 0.02 wt %, about 0.001 wt % to about 0.01 wt %, about 0.001 wt % to about 0.005 wt %, about 0.001 wt % to about 0.002 wt %, about 0.002 wt % to about 0.02 wt %, about 0.002 wt % to about 0.01 wt %, about 0.002 wt % to about 0.005 wt %, about 0.005 wt % to about 0.02 wt %, about 0.005 wt % to about 0.01 wt %, or about 0.01 wt % to about 0.02 wt %. For example, the $Fe_2O_3$ can be present in the glass-ceramic precursor in an amount of about 0 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, or any amount of $Fe_2O_3$ between these values.

In one aspect of the present disclosure, the glass-ceramic precursor includes a ratio of $Fe^{2+}$ content to a total iron content (where total iron content is defined as $Fe^{2+}+Fe^{3+}$) of less than about 0.5. For example, a ratio of $Fe^{2+}$ content to a total iron content ($Fe^{2+}+Fe^{3+}$) can be less than about 0.5, less than about 0.4, less than about 0.3, less than about 0.2, or less than about 0.1. In some examples, a ratio of $Fe^{2+}$ content to a total iron content ($Fe^{2+}+Fe^{3+}$) in the glass-ceramic precursor is from about 0.1 to about 0.5, about 0.1 to about 0.4, about 0.1 to about 0.3, about 0.1 to about 0.2, about 0.2 to about 0.5, about 0.2 to about 0.4, about 0.2 to about 0.3, about 0.3 to about 0.5, about 0.3 to about 0.4, or about 0.4 to about 0.5. In some examples, a ratio of $Fe^{2+}$ content to a total iron content ($Fe^{2+}+Fe^{3+}$) in the glass-ceramic precursor is about 0.5, about 0.4, about 0.3, about 0.2, about 0.1, or any ratio between these values.

According to one aspect of the present disclosure, the amount of $Fe_2O_3$ present in the glass-ceramic after ceramming is less than about 0.02% (by weight). For example, the $Fe_2O_3$ can be present in the glass-ceramic in an amount of less than about 0.02 wt %, less than about 0.01 wt %, less than about 0.005 wt %, less than about 0.002 wt %, or less than about 0.001 wt %. In some examples, the $Fe_2O_3$ can be present in the glass-ceramic in an amount of from about 0 wt % to about 0.02 wt %, about 0 wt % to about 0.01 wt %, about 0 wt % to about 0.005 wt %, about 0 wt % to about 0.002 wt %, about 0 wt % to about 0.001 wt %, about 0.001 wt % to about 0.02 wt %, about 0.001 wt % to about 0.01 wt %, about 0.001 wt % to about 0.005 wt %, about 0.001 wt % to about 0.002 wt %, about 0.002 wt % to about 0.02 wt %, about 0.002 wt % to about 0.01 wt %, about 0.002 wt % to about 0.005 wt %, about 0.005 wt % to about 0.02 wt %, about 0.005 wt % to about 0.01 wt %, or about 0.01 wt % to about 0.02 wt %. For example, the $Fe_2O_3$ can be present in the glass-ceramic in an amount of about 0 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, or any amount of $Fe_2O_3$ between these values.

In one aspect of the present disclosure, the glass-ceramic includes a ratio of $Fe^{2+}$ content to a total iron content (where total iron content is defined as $Fe^{2+}+Fe^{3+}$) of less than about 0.5 after ceramming. For example, a ratio of $Fe^{2+}$ content to a total iron content ($Fe^{2+}+Fe^{3+}$) is less than about 0.5, less than about 0.4, less than about 0.3, less than about 0.2, less than about 0.1, less than about 0.05, less than about 0.01, less than about 0.005, or less than about 0.001. In some examples, a ratio of $Fe^{2+}$ content to a total iron content ($Fe^{2+}+Fe^{3+}$) in the glass-ceramic is from about 0.001 to about 0.5, about 0.001 to about 0.4, about 0.001 to about 0.3, about 0.001 to about 0.2, about 0.001 to about 0.1, about 0.001 to about 0.005, about 0.005 to about 0.5, about 0.005 to about 0.4, about 0.005 to about 0.3, about 0.005 to about 0.2, or about 0.005 to about 0.1. In some examples, a ratio of $Fe^{2+}$ content to a total iron content ($Fe^{2+}+Fe^{3+}$) in the glass-ceramic is about 0.5, about 0.4, about 0.3, about 0.2, about 0.1, about 0.05, about 0.01, about 0.009, about 0.008, about 0.007, about 0.006, about 0.005, about 0.004, about 0.003, about 0.002, about 0.001, or any ratio between these values.

Exemplary glass-ceramic precursor compositions for making glass-ceramics according to the present disclosure are shown below in Table 1. Table 1 identifies the combination of materials and their respective amounts, in ranges, according to the present disclosure. The glass-ceramic precursor compositions of Table 1 may include additional components according to aspects of the present disclosure discussed herein.

TABLE 1

| Glass-Ceramic Precursor Composition | |
|---|---|
| Component | Amount Ranges (by mole of oxide) |
| $SiO_2$ | about 35% to about 60% |
| $Al_2O_3$ | about 13% to about 30% |
| ZnO | about 0% to about 20% |
| $ZrO_2$ | about 0.01% to about 10% |
| MgO | about 0.01% to about 20% |

The glass-ceramics of the present disclosure may be derived from the glass-ceramic precursor compositions of Table 1, as described above, and may be formed by any suitable forming method, non-limiting examples of which include slot forming, float forming, rolling processes, and fusion forming processes. For example, the glass-ceramic precursors of the present disclosure may be formed using a fusion drawing process (i.e., are fusion-formable). A conventional fusion drawing process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion drawing process offers the advantage that, because the two glass films flowing over the channel fuse together, neither of the outside surfaces of the resulting glass comes in contact with any part of the apparatus. Thus, due to the lack of contact, the outside surfaces of the fusion drawn glass article are generally considered to be smooth and flat and can often be used without additional grinding or polishing. In another example, the glass-ceramic precursors described herein may be formed by a slot draw process. The slot draw process is distinct from the fusion drawing process. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

The glass-ceramics of the present disclosure can be formed by ceramming the glass-ceramic precursors described herein under suitable conditions. In some examples, the ceramming process does not include a separate nucleation treatment phase to form crystal nuclei in the precursor. The absence of a separate nucleation treatment phase can simplify the production process and may result in energy and/or time savings. In some examples, the ceramming process can include a nucleation treatment phase that includes heating the glass-ceramic precursor to form crystal nuclei to facilitate control of the crystallite size, if desired.

Ceramming can be conducted by heating the glass-ceramic precursor to temperatures of at least about 750° C., at least about 800° C., at least about 850° C., at least about 900° C., at least about 950° C., at least about 1000° C., at least about 1050° C., or at least about 1100° C. In some examples, the ceramming occurs at temperatures of from about 750° C. to about 1100° C., about 800° C. to about 1100° C., about 850° C. to about 1100° C., about 900° C. to about 1100° C., about 950° C. to about 1100° C., about 1000° C. to about 1100° C., about 1050° C. to about 1100° C., about 750° C. to about 1050° C., about 800° C. to about 1050° C., about 850° C. to about 1050° C., about 900° C. to about 1050° C., about 950° C. to about 1050° C., about 1000° C. to about 1050° C., about 750° C. to about 1000° C., about 800° C. to about 1000° C., about 850° C. to about 1000° C., about 900° C. to about 1000° C., about 950° C. to about 1000° C., about 750° C. to about 950° C., about 800° C. to about 950° C., about 850° C. to about 950° C., about 900° C. to about 950° C., about 750° C. to about 900° C., about 800° C. to about 900° C., about 850° C. to about 900° C., about 750° C. to about 850° C., or about 800° C. to about 850° C. For example, ceramming can occur at a temperature of about 750° C., 800° C., 850° C., 900° C., 950° C., 1000° C., 1050° C., 1100° C., or any temperature between these values.

Heating during ceramming can occur for a predetermined time period of at least about 30 minutes, at least about 1 hour, at least about 1.5 hours, at least about 2 hours, at least about 2.5 hours, at least about 3 hours, at least about 3.5 hours, at least about 4 hours, at least about 4.5 hours, at least about 5 hours, at least about 5.5 hours, at least about 6 hours, at least about 6.5 hours, at least about 7 hours, at least about 7.5 hours, at least about 8 hours, at least about 8.5 hours, at least about 9 hours, at least about 9.5 hours, or at least about 10 hours. For example, heating during ceramming can occur for a predetermined time period of about 30 minutes to 1 hour, about 30 minutes to about 2 hours, about 30 minutes to about 3 hours, about 30 minutes to about 4 hours, about 30 minutes to about 5 hours, about 30 minutes to about 6 hours, about 30 minutes to about 7 hours, about 30 minutes to about 8 hours, about 30 minutes to about 9 hours, about 30 minutes to about 10 hours, about 1 hour to about 2 hours, about 1 hour to about 3 hours, about 1 hour to about 4 hours, about 1 hour to about 5 hours, about 1 hour to about 6 hours, about 1 hour to about 7 hours, about 1 hour to about 8 hours, about 1 hour to about 9 hours, about 1 hour to about 10 hours, about 2 hours to about 3 hours, about 2 hours to about 4 hours, about 2 hours to about 5 hours, about 2 hours to about 6 hours, about 2 hours to about 7 hours, about 2 hours to about 8 hours, about 2 hours to about 9 hours, about 2 hours to about 10 hours, about 3 hours to about 4 hours, about 3 hours to about 5 hours, about 3 hours to about 6 hours, about 3 hours to about 7 hours, about 3 hours to about 8 hours, about 3 hours to about 9 hours, about 3 hours to about 10 hours, about 4 hours to about 5 hours, about 4 hours to about 6 hours, about 4 hours to about 7 hours, about 4 hours to about 8 hours, about 4 hours to about 9 hours, about 4 hours to about 10 hours, about 5 hours to about 6 hours, about 5 hours to about 7 hours, about 5 hours to about 8 hours, about 5 hours to about 9 hours, about 5 hours to about 10 hours, about 6 hours to about 7 hours, about 6 hours to about 8 hours, about 6 hours to about 9 hours, about 6 hours to about 10 hours, about 7 hours to about 8 hours, about 7 hours to about 9 hours, about 7 hours to about 10 hours, about 8 hours to about 9 hours, or about 8 hours to about 10 hours. In some examples, the heating during ceramming occurs for a predetermined time period of about 30 minutes, about 1 hour, about 1.5 hours, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 8.5 hours, about 9 hours, about 9.5 hours, about 10 hours, or any time period between these values.

When the ceramming process includes a separate nucleation treatment phase, the nucleation treatment phase can include heat treating the glass-ceramic precursor at temperatures of at least about 700° C., at least about 750° C., at least about 800° C., at least about 850° C., at least about 900° C., at least about 950° C., at least about 1000° C. For example, the heat treating can occur at temperatures of from about 700° C. to about 1000° C., about 700° C. to about 950° C., about 700° C. to about 900° C., about 700° C. to about 850° C., about 700° C. to about 800° C., about 800° C. to about 1000° C., about 800° C. to about 950° C., about 800° C. to about 900° C., about 800° C. to about 850° C., about 850° C. to about 1000° C., about 850° C. to about 950° C., about 850° C. to about 900° C., about 900° C. to about 1000° C., or about 900° C. to about 950° C. In some examples, the nucleation treatment phase can include heat treating the glass-ceramic precursor at temperatures of about 700° C., about 750° C., about 800° C., about 850° C., about 900° C., about 950° C., about 1000° C., or any temperature between these values.

The heating treating during the nucleation treatment phase can occur for a predetermined period of time of at least about 30 minutes, at least about 1 hour, at least about 1.5 hours, at least about 2 hours, at least about 2.5 hours, at least about 3 hours, at least about 3.5 hours, or at least about 4 hours. For example, treating during the nucleation treatment phase can occur for a predetermined time period of about 30 minutes to 1 hour, about 30 minutes to about 2 hours, about 30 minutes to about 3 hours, about 30 minutes to about 4 hours, about 1 hour to about 2 hours, about 1 hour to about 3 hours, about 1 hour to about 4 hours, about 2 hours to about 3 hours, about 2 hours to about 4 hours, or about 3 hours to about 4 hours. In some examples, the treating during the nucleation treatment phase occurs for a predetermined time period of about 30 minutes, about 1 hour, about 1.5 hours, about 2 hours, about 2.5 hours, about 3 hours, about 3.5 hours, about 4 hours, or any time period between these values.

The glass-ceramics of the present disclosure may be chemically strengthened using any suitable process. In one example, the glass-ceramics of the present disclosure are chemically strengthened in an ion-exchange process. For example, the glass-ceramics of the present disclosure can be exposed to an ion exchange solution by dipping the glass-ceramic into a bath of the ion exchange solution, spraying the ion exchange solution onto the glass-ceramic, or otherwise physically applying the ion exchange solution to the glass-ceramic. Upon exposure to the glass-ceramic, the ion exchange solution may, according to some examples, be at a temperature of from about 400° C. to about 500° C., about 410° C. to about 490° C., about 420° C. to about 480° C., about 430° C. to about 470° C., or about 440° C. to about 460° C. In some examples, the temperature is about 400° C., about 410° C., about 420° C., about 430° C., about 440° C., about 450° C., about 460° C., about 470° C., about 480° C., about 490° C., about 500° C., or any temperature between these values.

The glass-ceramic may be exposed to the ion exchange solution for a time period of about 4 hours to about 48 hours. For example, the glass-ceramic may be exposed to the ion exchange solution for a time period of about 4 hours to about 48 hours, about 8 hours to about 48 hours, about 12 hours to about 48 hours, about 16 hours to about 48 hours, about 20 hours to about 48 hours, about 24 hours to about 48 hours, about 30 hours to about 48 hours, about 36 hours to about 48 hours, about 40 hours to about 48 hours, about 4 hours to about 40 hours, about 8 hours to about 40 hours, about 12 hours to about 40 hours, about 16 hours to about 40 hours, about 20 hours to about 40 hours, about 24 hours to about 40 hours, about 30 hours to about 40 hours, about 36 hours to about 40 hours, about 4 hours to about 36 hours, about 8 hours to about 36 hours, about 12 hours to about 36 hours, about 16 hours to about 36 hours, about 20 hours to about 36 hours, about 24 hours to about 36 hours, about 30 hours to about 36 hours, about 4 hours to about 30 hours, about 8 hours to about 30 hours, about 12 hours to about 30 hours, about 16 hours to about 30 hours, about 20 hours to about 30 hours, about 24 hours to about 30 hours, about 4 hours to about 24 hours, about 8 hours to about 24 hours, about 12 hours to about 24 hours, about 16 hours to about 24 hours, about 20 hours to about 24 hours, about 4 hours to about 20 hours, about 8 hours to about 20 hours, about 12 hours to about 20 hours, about 16 hours to about 20 hours, about 4 hours to about 16 hours, about 8 hours to about 16 hours, about 12 hours to about 16 hours, about 4 hours to about 12 hours, about 8 hours to about 12 hours, or about 4 hours to about 8 hours. In some examples, the glass-ceramic may be exposed to the ion exchange solution for a time period of about 4 hours, about 8 hours, about 12 hours, about 16 hours, about 20 hours, about 24 hours, about 30 hours, about 36 hours, about 40 hours, about 48 hours, or any time period between these values.

After an ion exchange process is performed, it should be understood that a composition at the surface of the glass ceramic may be different than the composition of the as-formed glass ceramic (i.e., the glass ceramic before it undergoes an ion exchange process). This results from one type of alkali metal ion in the as-formed glass, such as, for example $Li^+$ or $Na^+$, being replaced with larger alkali metal ions, such as, for example $Na^+$ or $K^+$, respectively. However, the composition of the glass ceramic at or near the center of the depth of the glass article will, in embodiments, be the least changed by the ion exchange process and may have a composition substantially the same or the same as the as-formed glass ceramic.

EXAMPLES

The following examples describe various features and advantages provided by the embodiments of the disclosure, and are in no way intended to limit aspects of the present disclosure and appended claims.

Example 1

Glass-ceramic precursors having the precursor compositions in Table 2 below were prepared and used to form glass-ceramics. The properties of the glass-ceramic precursors and glass-ceramics shown in Table 2 were determined according to the processes described herein. Each glass-ceramic precursor was treated according to a ceramming schedule that included heating at 950° C. for 4 hours with a ramp rate of 5° C./minute from room temperature to 700° C., followed by heating from 700° C. to 950° C. at a ramp rate of 1° C./minute.

TABLE 2

Exemplary Examples 1A-1C and Comparative Example 1.

| | Example 1A | Example 1B | Example 1C | Comparative Example 1 | Comparative Example 2 |
|---|---|---|---|---|---|
| Precursor Composition | | | | | |
| $SiO_2$ | 54.47 | 54.62 | 54.52 | 54.53 | 53.2 |
| $Al_2O_3$ | 20.91 | 21.05 | 21.00 | 20.95 | 21.2 |
| ZnO | 15.70 | 5.64 | — | 15.61 | 10.3 |
| MgO | 0.03 | 10.05 | 15.65 | 0.03 | 5.8 |
| $TiO_2$ | 0.01 | — | — | 0.01 | — |
| $ZrO_2$ | 5.10 | 4.88 | 5.10 | 5.01 | 4.4 |
| $Na_2O$ | 3.77 | 3.73 | 3.70 | 3.80 | 3.6 |
| $SnO_2$ | — | — | — | 0.05 | — |
| $As_2O_5$ | — | — | — | — | 0.1 |

TABLE 2-continued

Exemplary Examples 1A-1C and Comparative Example 1.

| | Example 1A | Example 1B | Example 1C | Comparative Example 1 | Comparative Example 2 |
|---|---|---|---|---|---|
| Glass-Ceramic Precursor | | | | | |
| Anneal Point (° C.) | 725 | — | — | — | — |
| Strain Point (° C.) | 683 | — | — | — | — |
| Total Fe as $Fe_2O_3$ (wt %) | 0.006 | — | — | 0.007 | — |
| $Fe^{2+}$ (wt %) | 0.001 | — | — | 0.005 | — |
| $Fe^{2+}$/Total Fe | 0.17 | — | — | 0.71 | — |
| Total Sn as $SnO_2$ (wt %) | — | — | — | 0.098 | — |
| $Sn^{2+}$ (wt %) | — | — | — | 0.011 | — |
| $Sn^{2+}$/Total Sn | — | — | — | 0.11 | — |
| Glass-Ceramic | | | | | |
| Anneal Point (° C.) | 919 | 904 | 886 | — | — |
| Strain Point (° C.) | 847 | 840 | 823 | — | — |
| Total Fe as $Fe_2O_3$ (wt %) | 0.005 | — | — | 0.008 | — |
| $Fe^{2+}$ (wt %) | <0.005 | — | — | 0.002 | — |
| $Fe^{2+}$/Total Fe | <0.005 | — | — | 0.34 | — |
| Total Sn as $SnO_2$ (wt %) | — | — | — | 0.107 | — |
| $Sn^{2+}$ (wt %) | — | — | — | 0.024 | — |
| $Sn^{2+}$/Total Sn | — | — | — | 0.26 | — |
| Gahnite (wt %) | 31 | 23 | 11 | 31 | — |
| Tetragonal $ZrO_2$ (wt %) | 6 | 7 | 7 | 6 | — |
| Glass (wt %) | 64 | 70 | 82 | 64 | — |
| Gahnite crystal size (nm) | 9 | — | — | 9 | — |
| Tetragonal $ZrO_2$ crystal size (nm) | 4 | — | — | 4 | — |
| L* | 95.74 | 96.05 | 96.10 | 94.96 | 95.80 |
| a* | 0.01 | 0.0 | 0.0 | 0.06 | −0.03 |
| b* | 0.41 | 0.23 | 0.29 | 1.37 | 0.43 |
| Hardness (GPa) | 9.5 | 9.6 | 9.5 | 9.5 | — |
| Elastic Modulus GPa) | 109 | 110 | 112 | 108.5 | 98.3 |

Table 3 below includes the refractive index data for each of the Examples 1A-1C and Comparative Example 1 at different wavelengths.

TABLE 3

Refractive Indices for Exemplary Examples1A-1C and Comparative Example 1.

| Wavelength (nm) | Example 1A | Example 1B | Example 1C | Comparative Example 1 |
|---|---|---|---|---|
| 406 | 1.6079 | 1.5955 | 1.5905 | 1.6082 |
| 532 | 1.5943 | 1.5823 | 1.5779 | 1.5945 |
| 633 | 1.5885 | 1.5770 | 1.5725 | 1.5888 |
| 790 | 1.5834 | 1.5724 | 1.5684 | 1.5836 |
| 828 | 1.5828 | 1.5715 | 1.5674 | 1.5830 |
| 981 | 1.5799 | — | — | 1.5799 |
| 1317 | 1.5752 | 1.5641 | 1.5602 | 1.5754 |
| 1549 | 1.5720 | 1.5613 | 1.5572 | 1.5721 |

The data for Examples 1A-1C demonstrate the ability of the glass-ceramics of the present disclosure to be substantially colorless, even in the absence of traditional decolorants, such as $SnO_2$ and $As_2O_5$. Compared to Comparative Example 1, Examples 1A-1C exhibit less color and similar mechanical properties (e.g., hardness and elastic modulus), while also being substantially free of $SnO_2$. Even in the presence of $SnO_2$, Comparative Example 1 exhibits more color, a brownish tint (represented by a b* value >1), compared to Examples 1A-1C, which have low a* and b* (indicative of a substantially colorless appearance). Comparative Example 2 exhibits a similar low level of color to that of Example 1A, however, Comparative Example 2 includes $As_2O_5$ and is thus not substantially free of arsenic. Examples 1A-1C demonstrate the ability of the glass-ceramics to be substantially colorless, even when the glass-ceramic is substantially free of arsenic, tin, antimony, and cesium. Examples 1A-1C exhibit similar hardness and elastic modulus values compared to Comparative Example 1, thus demonstrating that aspects of the present disclosure can be used to prepare glass-ceramics having a substantially colorless appearance in the absence of added arsenic, tin, antimony, and cesium, without negatively impacting mechanical properties such as hardness and elastic modulus.

Figure 2:
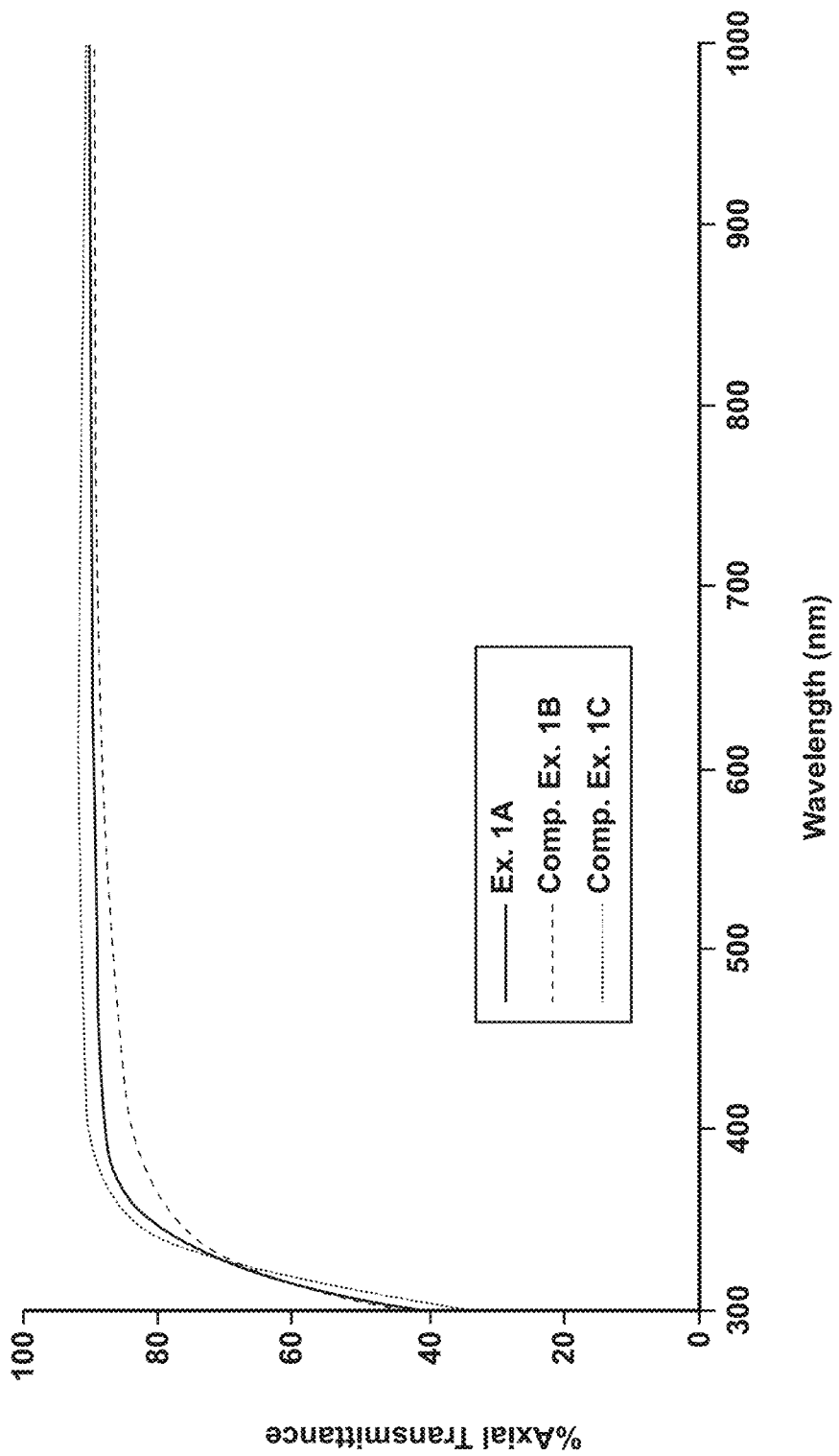
FIG. 2 is a plot of axial transmittance as a function of wavelength for an exemplary glass-ceramic according to an aspect of the present disclosure and comparative glass-ceramics.

FIG. 2 is a plot of percent axial transmittance as a function of wavelength for Example 1A ("Ex. 1A"), Comparative Example 1 ("Comp. Ex. 1"), and a comparison glass-ceramic, Comparative Example 3, that does not include a gahnite-spinel solid solution crystal phase ("Comp. Ex. 3"). Example 1A was a 0.89 mm thick sample, Comparative Example 1 was a 0.84 mm thick sample, and Comparative Example 3 was a 0.8 mm thick sample. As indicated by the data in FIG. 2, Example 1A (without $SnO_2$) had a similar or higher level of axial transparency compared to Comparative Example 1 (with $SnO_2$) for wavelengths between 350 nm and 1000 nm. The pre-cursor glass-ceramic composition used to form Comparative Example 3 is shown in Table 4 below. The comparison glass-ceramic of Comparative Example 3 includes 44 wt % of an LS2 crystal phase, 44 wt % of a petalite crystal phase, and 12 wt % of a glass phase and grain sizes of 30 nm to 60 nm.

TABLE 4

Glass-Ceramic Pre-Cursor Composition for Comparative Example 3.

| Component | Amount (mol %) |
|---|---|
| $SiO_2$ | 70.82 |
| $Al_2O_3$ | 4.24 |
| $P_2O_5$ | 0.84 |
| $Li_2O$ | 21.73 |
| $Na_2O$ | 0.06 |
| $K_2O$ | 0.07 |
| $ZrO_2$ | 2.01 |
| CaO | 0.03 |
| $Fe_2O_3$ | 0.02 |
| $HfO_2$ | 0.02 |
| $SnO_2$ | 0.15 |

Figure 3:
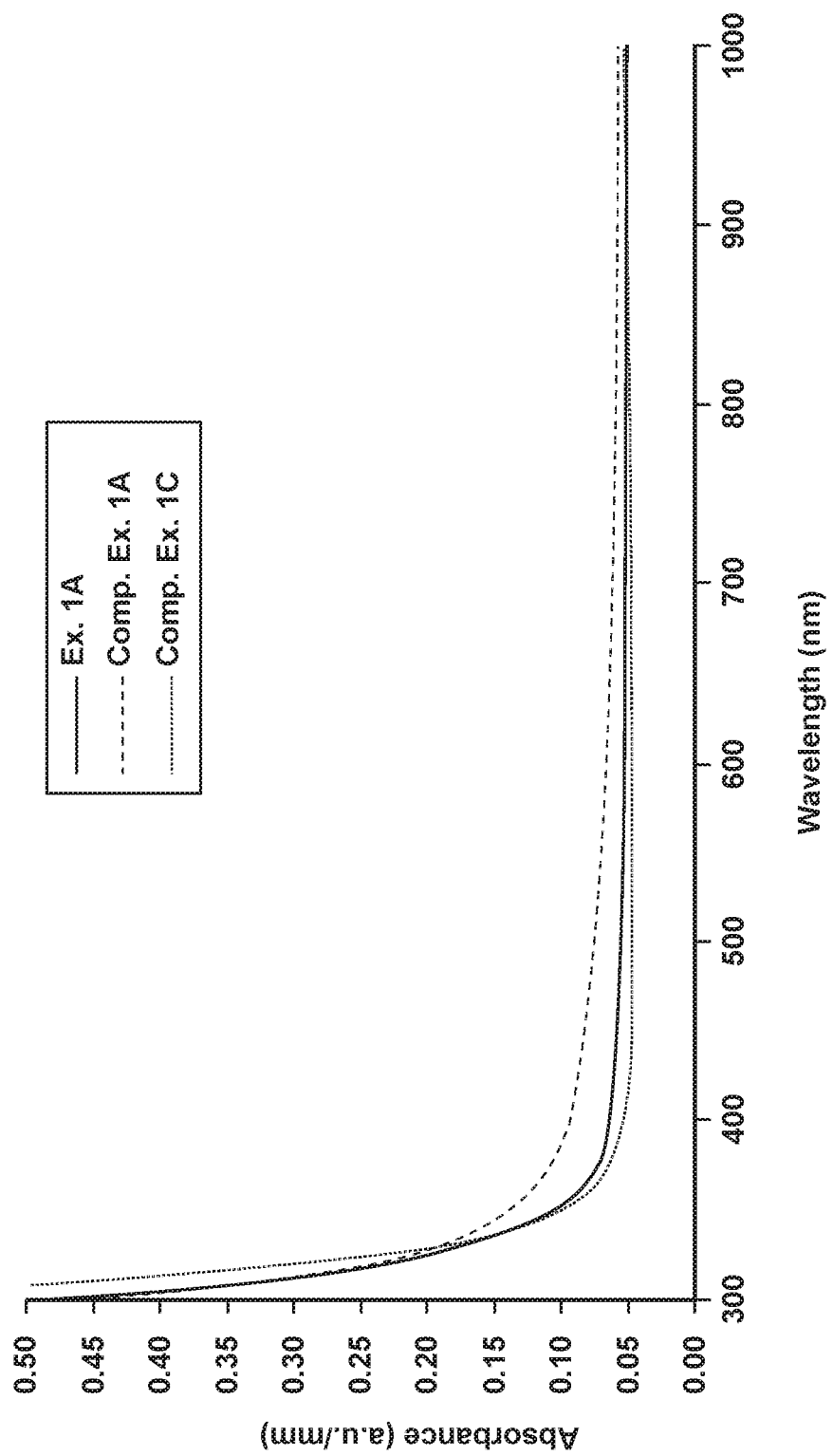
FIG. 3 is a plot of absorbance as a function of wavelength for an exemplary glass-ceramic according to an aspect of the present disclosure and comparative glass-ceramics.

FIG. 3 is a plot of absorbance as a function of wavelength for Example 1A ("Ex. 1A"), Comparative Example 1A ("Comp. Ex. 1"), and Comparative Example 3 ("Comp. Ex. 3"). As demonstrated in FIG. 3, Example 1A had a similar or lower absorbance compared to Comparative Example 1 for wavelengths of 350 nm to 1000 nm. The absorbance data was corrected for differences in path length.

Figure 4:
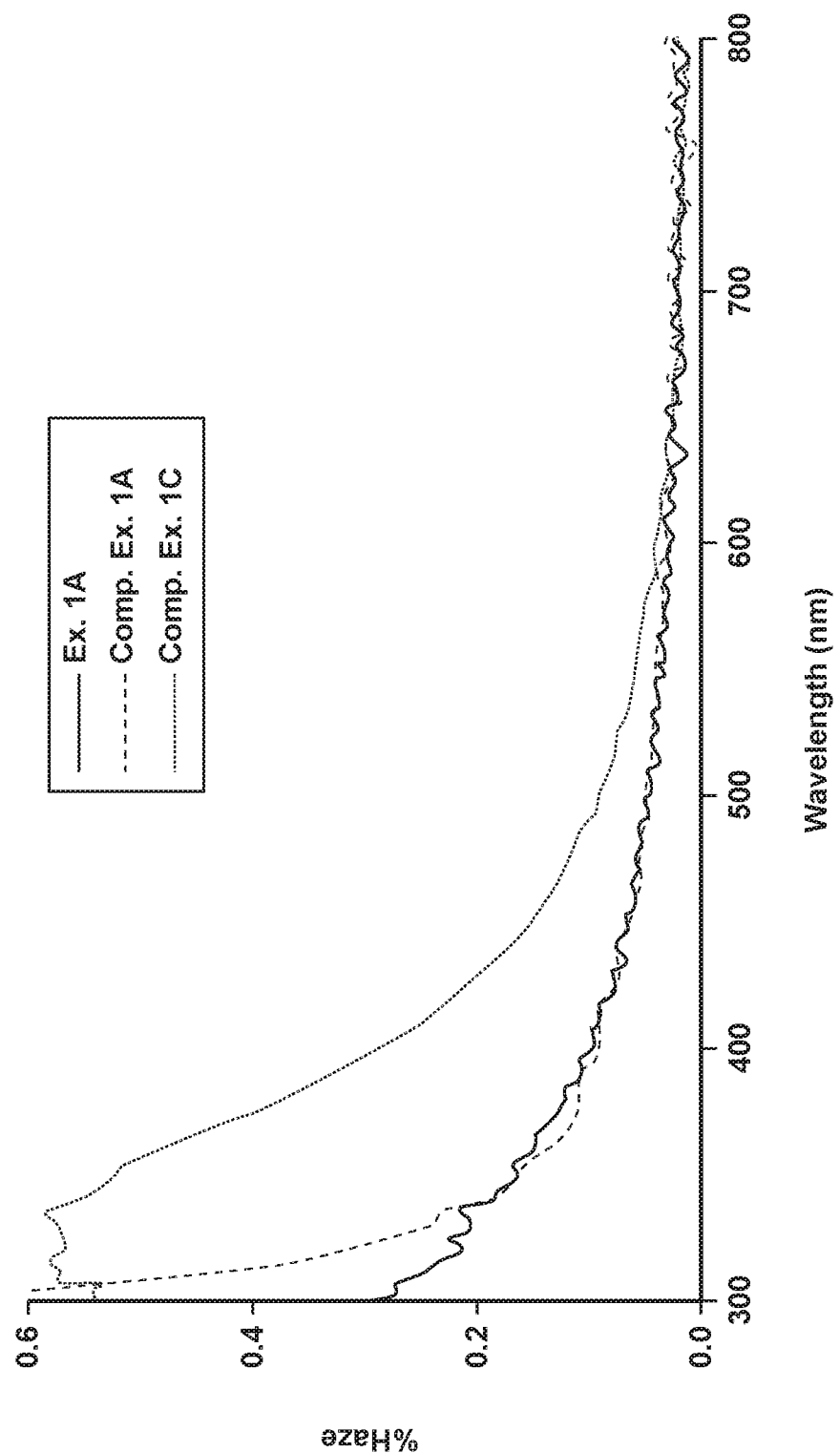
FIG. 4 is a plot of haze as a function of wavelength for an exemplary glass-ceramic according to an aspect of the present disclosure and comparative glass-ceramics.

FIG. 4 is a plot of percent haze as a function of wavelength for Example 1A ("Ex. 1A"), Comparative Example 1 ("Comp. Ex. 1"), and Comparative Example 3 ("Comp. Ex. 3"). As demonstrated in FIG. 4, Example 1A had a similar or lower haze value compared to Comparative Example 1 for wavelengths of 350 nm to 800 nm.

FIGS. 2-4, illustrate the ability of the glass-ceramics of the present disclosure to have optical properties desirable for applications as displays in electronic devices (e.g., high transmittance, low absorbance, and low haze), even when the glass-ceramic is substantially free of arsenic, tin, antimony, and cesium. The glass-ceramics of the present disclosure exhibit the desired optical properties with minimal or improved effect on the mechanical properties of the glass ceramics, (e.g., hardness and elastic modulus) compared to glass-ceramics that include arsenic or tin as a decolorant.

Example 2

Glass-ceramic precursors having the precursor compositions in Table 5 below were prepared and used to form glass-ceramics. The properties of the glass-ceramic precursors and glass-ceramics shown in Table 5 were determined according to the processes described herein. Each glass-ceramic precursor was treated according to a ceramming schedule that included heating at 950° C. for 4 hours with a ramp rate of 5° C./minute from room temperature to 700° C., followed by heating from 700° C. to 950° C. at a ramp rate of 1° C./minute.

TABLE 5

Exemplary Example 2A and Comparative Examples 4 and 5.

| | Example 2A | Comparative Example 4 | Comparative Example 5 |
|---|---|---|---|
| | Precursor Composition | | |
| $SiO_2$ | 55.4 | 53.4 | 55.5 |
| $Al_2O_3$ | 19.5 | 21.9 | 19.6 |
| ZnO | 15.9 | 10.1 | 15.8 |
| MgO | — | 2.9 | — |
| BaO | — | 2.4 | — |
| $TiO_2$ | — | 5.8 | — |
| $ZrO_2$ | 5.1 | 3.4 | 5.1 |
| $Na_2O$ | 4.0 | 0.1 | 4.0 |
| $SnO_2$ | — | — | 0.06 |
| L* | 96.01 | 94.58 | 96.03 |
| a* | −0.05 | −0.06 | 0.00 |
| b* | 0.39 | 2.39 | 0.24 |
| | Glass-Ceramic | | |
| L* | 95.73 | 83.8 | 93.55 |
| a* | −0.02 | 1.74 | 0.1 |
| b* | 0.61 | 4.47 | 3.26 |

The color space data of Example 2A ("Ex. 2A"), Comparative Example 4 ("Comp. Ex. 4"), and Comparative Example 5 ("Comp. Ex. 5") is summarized in FIG. 5. Example 2A and Comparative Example 5 are formed from a similar glass-ceramic precursor composition, however, Comparative Example 5 also includes $SnO_2$, a traditional fining agent and decolorant. The precursor composition used to form the glass-ceramic of Comparative Example 4 is free of arsenic, tin, antimony, and cesium, but includes other components outside the compositions of the present disclosure, such as a high amount of $TiO_2$. In addition, Comparative Example 4 was prepared using an $SiO_2$ source having a higher $Fe_2O_3$ content than the $SiO_2$ source used to form Example 2A and Comparative Example 5.

Figure 5:
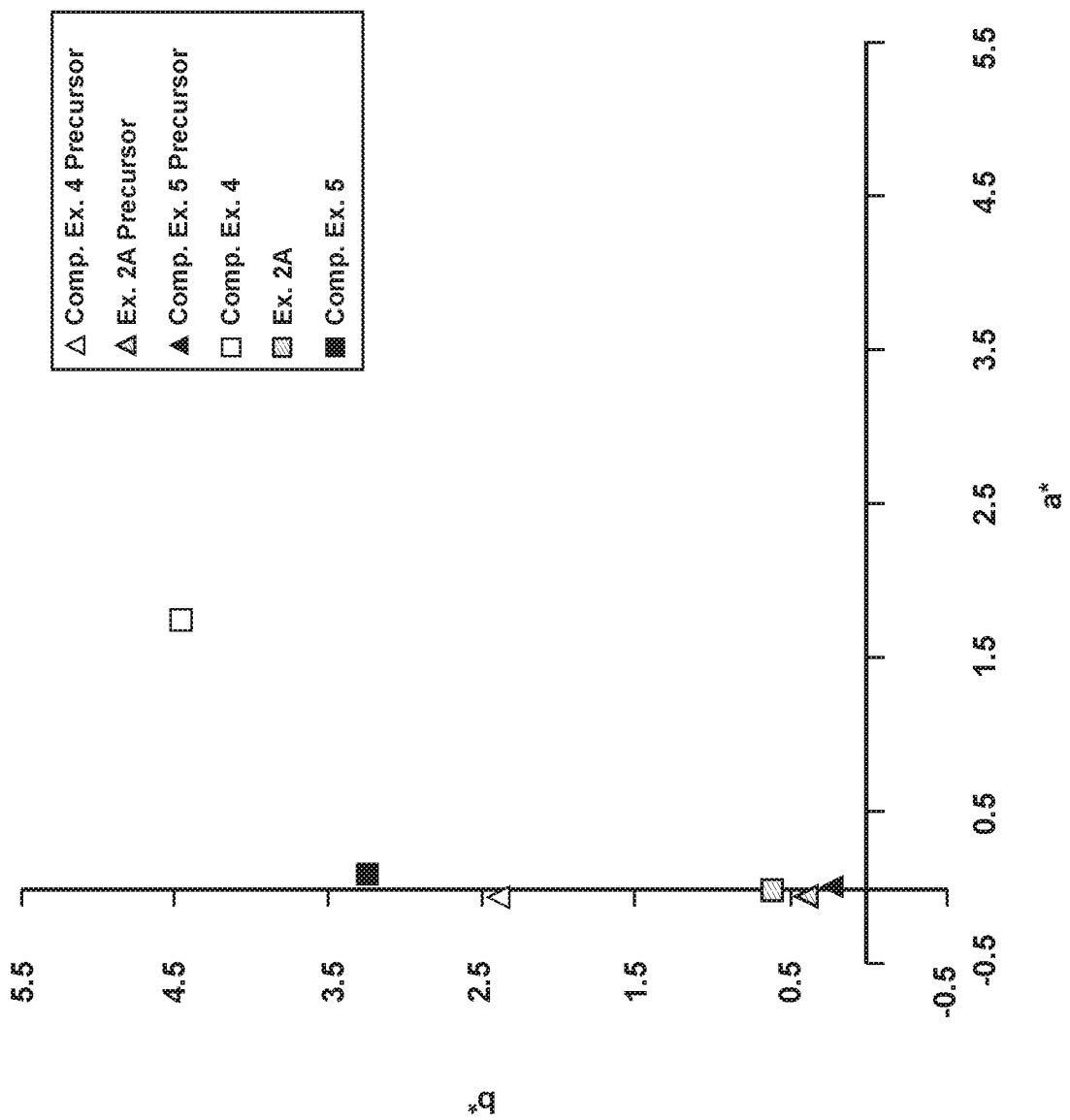
FIG. 5 is a plot of CIE LAB color space color values a* and b* for an exemplary glass-ceramic precursor and glass-ceramic according to aspects of the present disclosure and comparative glass-ceramic precursors and glass-ceramics.

The data shown in Table 5 and illustrated graphically in FIG. 5 shows that the exemplary composition of Example 2A exhibits low color as a glass-ceramic precursor (before ceramming) and maintains that low color even as a glass-ceramic (after ceramming). In contrast, Comparative Example 4 exhibits a degree of color even before ceramming (as evidenced by a b* value of 2.39) that increases after ceramming, as evidenced by the high a* and b* values of the glass-ceramic (corresponding to a brownish tint). While not wishing to be bound by any theory, it is believed that the difference in iron content in the glass-ceramic pre-cursor may play at least a part in the difference in color of the glass-ceramics of Example 2A and the Comparative Example 4. The increased amount of $TiO_2$ in the Comparative Example 4 may also contribute to the higher color exhibited by the glass-ceramic after ceramming. While Comparative Example 5 exhibits little color before ceramming, the color of the sample increases significantly after ceramming, as evidence by the high b* value in the glass-ceramic of Comparative Example 5. The difference in color between Example 2A and Comparative Example 5 before and after ceramming show a smaller shift in color of the glass-ceramic after ceramming in the absence of fining agents (such as $SnO_2$).

The following non-limiting aspects are encompassed by the present disclosure:

According to a first aspect of the present disclosure, a glass-ceramic includes a first crystal phase including $(Mg_xZn_{1-x})Al_2O_4$, where x is ≤1, and a second crystal phase including tetragonal $ZrO_2$, wherein the glass-ceramic is substantially free of arsenic, tin, antimony, and cesium, each of the arsenic, tin, antimony, and cesium present at less than 0.01% (by mole of oxide), and wherein the glass-ceramic includes a transmittance of at least about 80% to light having a wavelength of 380 nm to 760 nm.

According to the first aspect of the present disclosure, in a second aspect of the present disclosure the glass-ceramic includes at least one of: a CIE LAB L* value greater than about 90; a CIE LAB a* value of about −0.2 to about 0.2; and a CIE LAB b* value of about −0.1 to about 0.8, wherein L*, a*, and b* are each measured at an angle of incidence (AOI) of 10 degrees with a D65 illuminant at a wavelength range of 380 nm to 760 nm.

According to the first aspect or the second aspect of the present disclosure, in a third aspect of the present disclosure, the glass-ceramic includes $SiO_2$ from about 35% to about 60% (by mole of oxide).

According to any of the first through the third aspects of the present disclosure, in a fourth aspect of the present disclosure, the glass-ceramic further includes at least one of: $Fe_2O_3$ at less than about 0.02% (by weight); and a ratio of an $Fe^{2+}$ content to a total iron content ($Fe^{2+}+Fe^{3+}$) of less than about 0.5.

According to any of the first through the fourth aspects of the present disclosure, in a fifth aspect of the present disclosure, the glass-ceramic further includes at least one of: $TiO_2$ at about 0% to about 4% (by mole of oxide); and $Na_2O$ at greater than about 2% (by mole of oxide).

According to any of the first through the fifth aspects of the present disclosure, in a sixth aspect of the present disclosure, the glass-ceramic is substantially free of BaO, the BaO at less than 0.01% (by mole of oxide).

According to any of the first through the sixth aspects of the present disclosure, in a seventh aspect of the present disclosure, the glass-ceramic further includes a crystallinity of at least about 10% (by weight).

According to any of the first through the seventh aspects of the present disclosure, in an eighth aspect of the present disclosure, the first crystal phase is further characterized by a crystallite size of less than about 20 nm.

According to any of the first through the eighth aspects of the present disclosure, in a ninth aspect of the present disclosure, the glass-ceramic further includes a maximum hardness of about 8 GPa to about 15 GPa, as measured by a Berkovich nanoindenter.

According to any of the first through the ninth aspects of the present disclosure, in a tenth aspect of the present disclosure, the glass-ceramic further includes a modulus of elasticity of about 90 GPa to about 120 GPa, as measured using resonant ultrasonic spectroscopy.

According to any of the first through the tenth aspects of the present disclosure, in an eleventh aspect of the present disclosure, the glass-ceramic further includes at least one of: a haze value of less than about 0.7% for light having a wavelength of 300 nm; a haze value of less than about 0.5% for light having a wavelength of 350 nm; and a haze value of less than about 0.3% for light having a wavelength of 400 nm to 800 nm.

According to any of the first through the eleventh aspects of the present disclosure, in a twelfth aspect of the present disclosure, the glass-ceramic further includes at least one of: an axial transmittance of at least about 30% to light having a wavelength of 300 nm; an axial transmittance of at least about 65% to light having a wavelength of 350 nm; an axial transmittance of at least about 80% to light having a wavelength of 400 nm; an axial transmittance of at least about 85% to light having a wavelength of 450 nm; and an axial transmittance of at least about 85% to light having a wavelength of 500 nm to 800 nm.

According to any of the first through the twelfth aspects of the present disclosure, in a thirteenth aspect of the present disclosure, the glass-ceramic further include at least one of: an absorbance of less than about 0.5 absorbance units/millimeter (a.u./mm) for light having a wavelength of 300 nm; an absorbance of less than about 0.15 absorbance units/millimeter (a.u./mm) for light having a wavelength of 350 nm; and an absorbance of less than about 0.1 absorbance units/millimeter (a.u./mm) for light having a wavelength of 500 nm to 800 nm.

According to a fourteenth aspect of the present disclosure, a glass-ceramic includes a first crystal phase including $(Mg_xZn_{1-x})Al_2O_4$, where $x \leq 1$, and a second crystal phase including tetragonal $ZrO_2$, wherein the glass-ceramic is substantially free of arsenic, tin, antimony, and cesium, each of the arsenic, tin, antimony, and cesium present at less than 0.01% (by mole of oxide), wherein the glass-ceramic includes a transmittance of at least 80% to light having a wavelength of 380 nm to 760 nm, and further wherein the glass-ceramic is derived from a glass-ceramic precursor composition that includes: $SiO_2$ from about 35% to about 60%, $Al_2O_3$ from about 13% to about 30%, ZnO from about 0% to about 20%, $ZrO_2$ from about 0.1% to about 10%, and MgO from about 0.01% to about 20% (by mole of oxide).

According to the fourteenth aspect of the present disclosure, in a fifteenth aspect of the present disclosure, the glass-ceramic further includes at least one of: a CIE LAB L* value greater than about 90; a CIE LAB a* value of about −0.2 to about 0.2; and a CIE LAB b* value of about −0.1 to about 0.8, wherein L*, a*, and b* are each measured at an angle of incidence (AOI) of 10 degrees with a D65 illuminant at a wavelength range of 380 nm to 760 nm.

According to any of the fourteenth or the fifteenth aspects of the present disclosure, in a sixteenth aspect of the present disclosure, further including at least one of: $Fe_2O_3$ at less than about 0.02% (by weight); and a ratio of an $Fe^{2+}$ content to a total iron content ($Fe^{2+}+Fe^{3+}$) of less than about 0.5.

According to any of the fourteenth through the sixteenth aspects of the present disclosure, in a seventeenth aspect of the present disclosure, further including at least one of: $TiO_2$ at about 0% to about 4% (by mole of oxide); and $Na_2O$ at greater than about 2% (by mole of oxide).

According to any of the fourteenth through the seventeenth aspects of the present disclosure, in an eighteenth aspect of the present disclosure, the glass-ceramic is substantially free of BaO, the BaO at less than 0.01% (by mole of oxide).

According to any of the fourteenth through the eighteenth aspects of the present disclosure, in a nineteenth aspect of the present disclosure, x is greater than zero.

According to any of the fourteenth through the nineteenth aspects of the present disclosure, in a twentieth aspect of the present disclosure, the glass-ceramic further includes a maximum hardness of about 8 GPa to about 15 GPa, as measured by a Berkovich nanoindenter.

According to any of the fourteenth through the twentieth aspects of the present disclosure, in a twenty-first aspect of the present disclosure, the glass-ceramic further includes a modulus of elasticity of about 90 GPa to about 120 GPa, as measured using resonant ultrasonic spectroscopy.

According to any of the fourteenth through the twenty-first aspects of the present disclosure, in a twenty-second aspect of the present disclosure, the glass-ceramic further includes at least one of: a haze value of less than about 0.7% for light having a wavelength of 300 nm; a haze value of less than about 0.5% for light having a wavelength of 350 nm; and a haze value of less than about 0.3% for light having a wavelength of 400 nm to 800 nm.

According to any of the fourteenth through the twenty-second aspects of the present disclosure, in a twenty-third aspect of the present disclosure, the glass-ceramic further includes at least one of: an axial transmittance of at least about 30% to light having a wavelength of 300 nm; an axial transmittance of at least about 65% to light having a wavelength of 350 nm; an axial transmittance of at least about 80% to light having a wavelength of 400 nm; an axial transmittance of at least about 85% to light having a wavelength of 450 nm; and an axial transmittance of at least about 85% to light having a wavelength of 500 nm to 800 nm.

According to a twenty-fourth aspect of the present disclosure, a method of making a glass-ceramic includes: forming a glass-ceramic precursor from a composition including: $SiO_2$ from about 35% to about 60%, $Al_2O_3$ from about 13% to about 30%, ZnO from about 0% to about 20%, $ZrO_2$ from about 0.1% to about 10%, and MgO from about 0.01% to about 20% (by mole of oxide); and heating the glass-ceramic precursor to form a glass-ceramic article including: a first crystal phase including $(Mg_xZn_{1-x})Al_2O_4$, where x is ≤1; and a second crystal phase including tetragonal $ZrO_2$, wherein the glass-ceramic is substantially free of arsenic, tin, antimony, and cesium, such that each of the arsenic, tin, antimony, and cesium is present at less than 0.01% (by mole of oxide), and wherein the glass-ceramic is characterized by a transmittance of at least 80% to light having a wavelength of 380 nm to 760 nm.

According to the twenty-fourth aspect of the present disclosure, in a twenty-fifth aspect of the present disclosure, a raw material source of the $SiO_2$ includes less than 0.002% $Fe_2O_3$ (by weight).

According to any of the twenty-fourth through the twenty-fifth aspects of the present disclosure, in a twenty-sixth aspect of the present disclosure, the heating the glass-ceramic precursor includes heating at a temperature of at least about 750C for a time period of at least about 30 minutes.

According to any of the twenty-fourth through the twenty-sixth aspects of the present disclosure, in a twenty-seventh aspect of the present disclosure, the glass-ceramic further includes at least one of: $Fe_2O_3$ at less than about 0.02% (by weight); and a ratio of an $Fe^{2+}$ content to a total iron content ($Fe^{2+}+Fe^{3+}$) of less than about 0.2.

According to any of the twenty-fourth through the twenty-seventh aspects of the present disclosure, in a twenty-eighth aspect of the present disclosure, the glass-ceramic precursor composition further includes at least one of: $TiO_2$ at about 0% to about 4% (by mole of oxide); and $Na_2O$ at greater than about 2% (by mole of oxide).

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A glass-ceramic, comprising:
a first crystal phase including $(Mg_xZn_{1-x})Al_2O_4$, where x≤1;
a second crystal phase including tetragonal $ZrO_2$,
wherein the glass-ceramic is free of arsenic, tin, antimony, and cesium,
wherein the glass-ceramic comprises a transmittance of at least 80% to light having a wavelength of 380 nm to 760 nm, and
further wherein the glass-ceramic is derived from a glass-ceramic precursor composition that comprises:
$SiO_2$ from 54% to about 59%,
$Al_2O_3$ from 19% to about 30%,
ZnO from about 0% to about 20%,
$ZrO_2$ from about 4% to about 6%, and
MgO from about 0.01% to about 20% (by mole of oxide);
further wherein the glass-ceramic further comprises:
a CIE LAB L* value greater than about 90;
a CIE LAB a* value of about −0.2 to about 0.2; and
a CIE LAB b* value of about −0.1 to about 0.8,
wherein L*, a*, and b* are each measured at an angle of incidence (AOI) of 10 degrees with a D65 illuminant at a wavelength range of 380 nm to 760 nm.

2. The glass-ceramic of claim 1, wherein the glass-ceramic further comprises at least one of:
a crystallinity of at least about 10% (by weight); and
a crystallite size of the first crystal phase of less than about 20 nm.

3. The glass-ceramic of claim 1, wherein the glass-ceramic further comprises at least one of:
an absorbance of less than about 0.5 absorbance units/millimeter (a.u./mm) for light having a wavelength of 300 nm;
an absorbance of less than about 0.15 absorbance units/millimeter (a.u./mm) for light having a wavelength of 350 nm; and
an absorbance of less than about 0.1 absorbance units/millimeter (a.u./mm) for light having a wavelength of 500 nm to 800 nm.

4. The glass-ceramic of claim 1, wherein the glass-ceramic further comprises a total crystallinity of 15 wt % to 40 wt %.

5. The glass-ceramic of claim 1, further comprising at least one of:
$Fe_2O_3$ at less than about 0.02% (by weight); and
a ratio of an $Fe^{2+}$ content to a total iron content ($Fe^{2+}+Fe^{3+}$) of less than about 0.5.

6. The glass-ceramic of claim 1, further comprising:
$Na_2O$ at greater than about 2% (by mole of oxide).

7. The glass-ceramic of claim 1, wherein the glass-ceramic further comprises at least one of:
a maximum hardness of about 8 GPa to about 15 GPa, as measured by a Berkovich nanoindenter; and
a modulus of elasticity of about 90 GPa to about 120 GPa, as measured using resonant ultrasonic spectroscopy.

8. The glass-ceramic of claim 1, wherein the glass-ceramic further comprises at least one of:
a haze value of less than about 0.7% for light having a wavelength of 300 nm;
a haze value of less than about 0.5% for light having a wavelength of 350 nm; and
a haze value of less than about 0.3% for light having a wavelength of 400 nm to 800 nm.

9. The glass-ceramic of claim 1, wherein the glass-ceramic further comprises at least one of:
an axial transmittance of at least about 30% to light having a wavelength of 300 nm;
an axial transmittance of at least about 65% to light having a wavelength of 350 nm;
an axial transmittance of at least about 85% to light having a wavelength of 450 nm; and an axial transmittance of at least about 85% to light having a wavelength of 500 nm to 800 nm.

10. A method of making a glass-ceramic, comprising:
forming a glass-ceramic precursor from a composition comprising:
  $SiO_2$ from 54% to about 59%,
  $Al_2O_3$ from 19% to about 30%,
  ZnO from about 0% to about 20%,
  $ZrO_2$ from about 4% to about 6%, and
  MgO from about 0.01% to about 20% (by mole of oxide); and
heating the glass-ceramic precursor to form a glass-ceramic article comprising:
  a first crystal phase including $(Mg_xZn_{1-x})Al_2O_4$, where x is ≤1; and
  a second crystal phase including tetragonal $ZrO_2$,
wherein the glass-ceramic is free of arsenic, tin, antimony, and cesium, and
wherein the glass-ceramic is characterized by a transmittance of at least 80% to light having a wavelength of 380 nm to 760 nm,
wherein, the glass-ceramic comprises:
  a CIE LAB L* value greater than about 90;
  a CIE LAB a* value of about −0.2 to about 0.2; and
  a CIE LAB b* value of about −0.1 to about 0.8,
  wherein L*, a*, and b* are each measured at an angle of incidence (AOI) of 10 degrees with a D65 illuminant at a wavelength range of 380 nm to 760 nm.

11. The method of claim 10, wherein a raw material source of the $SiO_2$ comprises less than 0.002% $Fe_2O_3$ (by weight).

12. The method of claim 10, wherein the glass-ceramic further comprises at least one of:
  $Fe_2O_3$ at less than about 0.02% (by weight); and
  a ratio of an $Fe^{2+}$ content to a total iron content ($Fe^{2+}$+ $Fe^{3+}$) of less than about 0.2.

13. The method of claim 10, wherein the glass-ceramic precursor composition further comprises:
  $Na_2O$ at greater than about 2% (by mole of oxide).

* * * * *